US009724635B2

(12) United States Patent
Merritt et al.

(10) Patent No.: US 9,724,635 B2
(45) Date of Patent: Aug. 8, 2017

(54) RECTANGULAR STACKED FLUTED FILTER CARTRIDGE

(71) Applicants: Steven J. Merritt, Kearney, NE (US); Michael Von Seggern, Kearney, NE (US)

(72) Inventors: Steven J. Merritt, Kearney, NE (US); Michael Von Seggern, Kearney, NE (US)

(73) Assignee: Bladwin Filters, Inc., Kearney, NE (US)

( * ) Notice: Subject to any disclaimer, the term of this patent is extended or adjusted under 35 U.S.C. 154(b) by 157 days.

(21) Appl. No.: 14/209,378

(22) Filed: Mar. 13, 2014

(65) Prior Publication Data

US 2014/0260139 A1    Sep. 18, 2014

Related U.S. Application Data

(60) Provisional application No. 61/784,015, filed on Mar. 14, 2013.

(51) Int. Cl.
*B01D 46/52* (2006.01)
*B01D 46/00* (2006.01)

(52) U.S. Cl.
CPC ....... *B01D 46/526* (2013.01); *B01D 46/0005* (2013.01); *Y10T 29/4973* (2015.01)

(58) Field of Classification Search
CPC ............ B01D 46/0004; B01D 46/0005; B01D 46/526; B01D 46/52; B01D 2275/206; B01D 2275/027; B01D 2275/201

USPC ...... 55/521, 357, 385.3, 484, 502, 503, 529, 55/498
See application file for complete search history.

(56) References Cited

U.S. PATENT DOCUMENTS

| 5,536,290 | A | * | 7/1996 | Stark | B01D 46/2414 55/498 |
| 5,820,646 | A | | 10/1998 | Gillingham et al. | |
| 6,190,432 | B1 | | 2/2001 | Gieseke et al. | |
| 6,306,192 | B1 | * | 10/2001 | Greif | B01D 46/0004 55/495 |
| 6,348,084 | B1 | * | 2/2002 | Gieseke | B01D 46/0002 55/357 |
| 6,387,143 | B1 | * | 5/2002 | Adiletta | B01D 46/10 55/497 |
| 6,569,219 | B1 | * | 5/2003 | Connor | B01D 46/2414 55/490 |
| 7,323,029 | B2 | * | 1/2008 | Engelland | B01D 46/0004 123/198 E |
| 7,351,270 | B2 | | 4/2008 | Engelland et al. | |
| 7,625,419 | B2 | | 12/2009 | Nelson et al. | |

(Continued)

*Primary Examiner* — Jacob T Minskey
*Assistant Examiner* — Min-Chau Pham
(74) *Attorney, Agent, or Firm* — Reinhart Boerner Van Deuren P.C.

(57) ABSTRACT

A fluted filter cartridge is provided. The fluted filter cartridge includes filter media including an inlet flow face and an outlet flow face. The inlet flow face and the outlet flow face are generally parallel. The filter cartridge includes a frame defining a central opening. The filter media is coupled to the frame such that fluid to be filtered may be directed through the central opening to the inlet flow face of the filter media. The frame includes a top surface. The inlet flow face of the filter media is located below the top surface of the frame.

27 Claims, 26 Drawing Sheets

(56) References Cited

U.S. PATENT DOCUMENTS

| | | | |
|---|---|---|---|
| 7,648,545 B2 * | 1/2010 | Amesoeder | B01D 46/525 55/385.3 |
| 7,658,777 B2 * | 2/2010 | Kopec | B01D 46/0005 55/385.3 |
| 7,674,308 B2 * | 3/2010 | Krisko | B01D 45/16 55/498 |
| 7,708,795 B2 * | 5/2010 | Westlund | B01D 46/002 210/497.01 |
| 7,713,321 B2 | 5/2010 | Kuempel et al. | |
| 7,964,010 B2 * | 6/2011 | Lane | B01D 46/0031 55/323 |
| 7,972,404 B2 | 7/2011 | Kuempel et al. | |
| 8,034,145 B2 | 10/2011 | Boehrs et al. | |
| 8,062,399 B2 | 11/2011 | Nelson et al. | |
| 8,147,582 B2 | 4/2012 | Engelland et al. | |
| 8,277,531 B2 | 10/2012 | Brown et al. | |
| 8,277,532 B2 | 10/2012 | Reichter et al. | |
| 8,292,983 B2 | 10/2012 | Reichter et al. | |
| 8,328,897 B2 | 12/2012 | Nelson et al. | |
| 8,357,219 B2 * | 1/2013 | Boehrs | B01D 46/10 55/480 |
| 8,382,875 B2 | 2/2013 | Engelland et al. | |
| 8,480,779 B2 | 7/2013 | Boehrs et al. | |
| 8,491,691 B2 | 7/2013 | Raether | |
| 8,496,723 B2 | 7/2013 | Reichter et al. | |
| 8,617,276 B2 | 12/2013 | Raether et al. | |
| 8,636,820 B2 | 1/2014 | Reichter et al. | |
| 8,709,119 B2 | 4/2014 | Reichter et al. | |
| 2003/0217534 A1 * | 11/2003 | Krisko | B01D 45/12 55/337 |
| 2005/0235620 A1 * | 10/2005 | Connor | B01D 46/0005 55/498 |
| 2007/0130896 A1 | 6/2007 | Walz et al. | |
| 2007/0246417 A1 | 10/2007 | Wright et al. | |
| 2008/0110142 A1 * | 5/2008 | Nelson | B01D 46/4227 55/357 |
| 2008/0115758 A1 | 5/2008 | Engelland et al. | |
| 2010/0139629 A1 * | 6/2010 | Engelland | B01D 46/0004 123/559.1 |
| 2011/0173937 A1 | 7/2011 | Nelson | |
| 2012/0110962 A1 | 5/2012 | Dewit et al. | |
| 2012/0124947 A1 | 5/2012 | Dewit et al. | |
| 2013/0167491 A1 | 7/2013 | Engelland et al. | |
| 2013/0239530 A1 | 9/2013 | Reichter et al. | |
| 2013/0298770 A1 | 11/2013 | Raether | |
| 2014/0026527 A1 | 1/2014 | Bruce et al. | |
| 2014/0102059 A1 | 4/2014 | Boehrs et al. | |

* cited by examiner

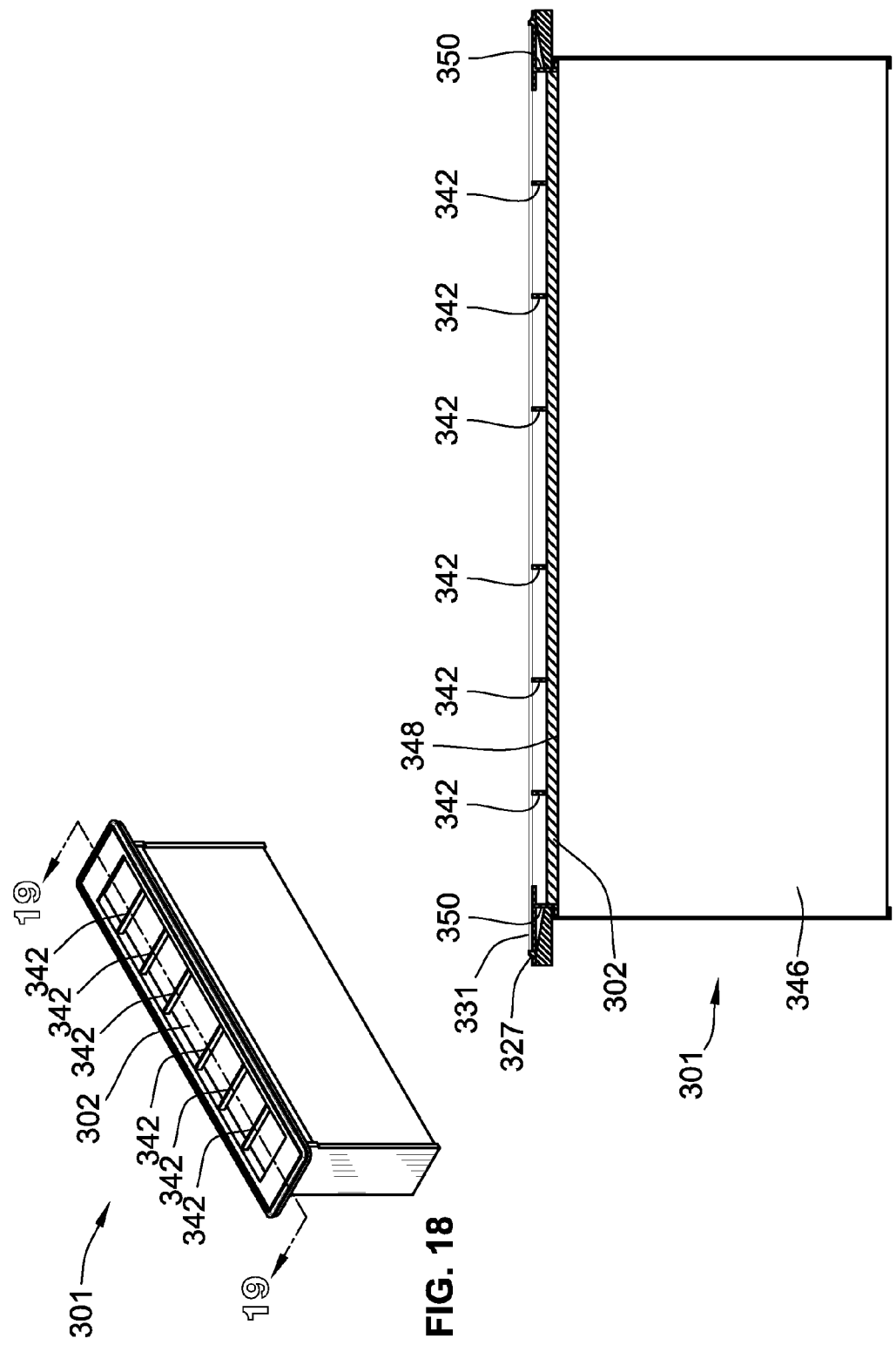

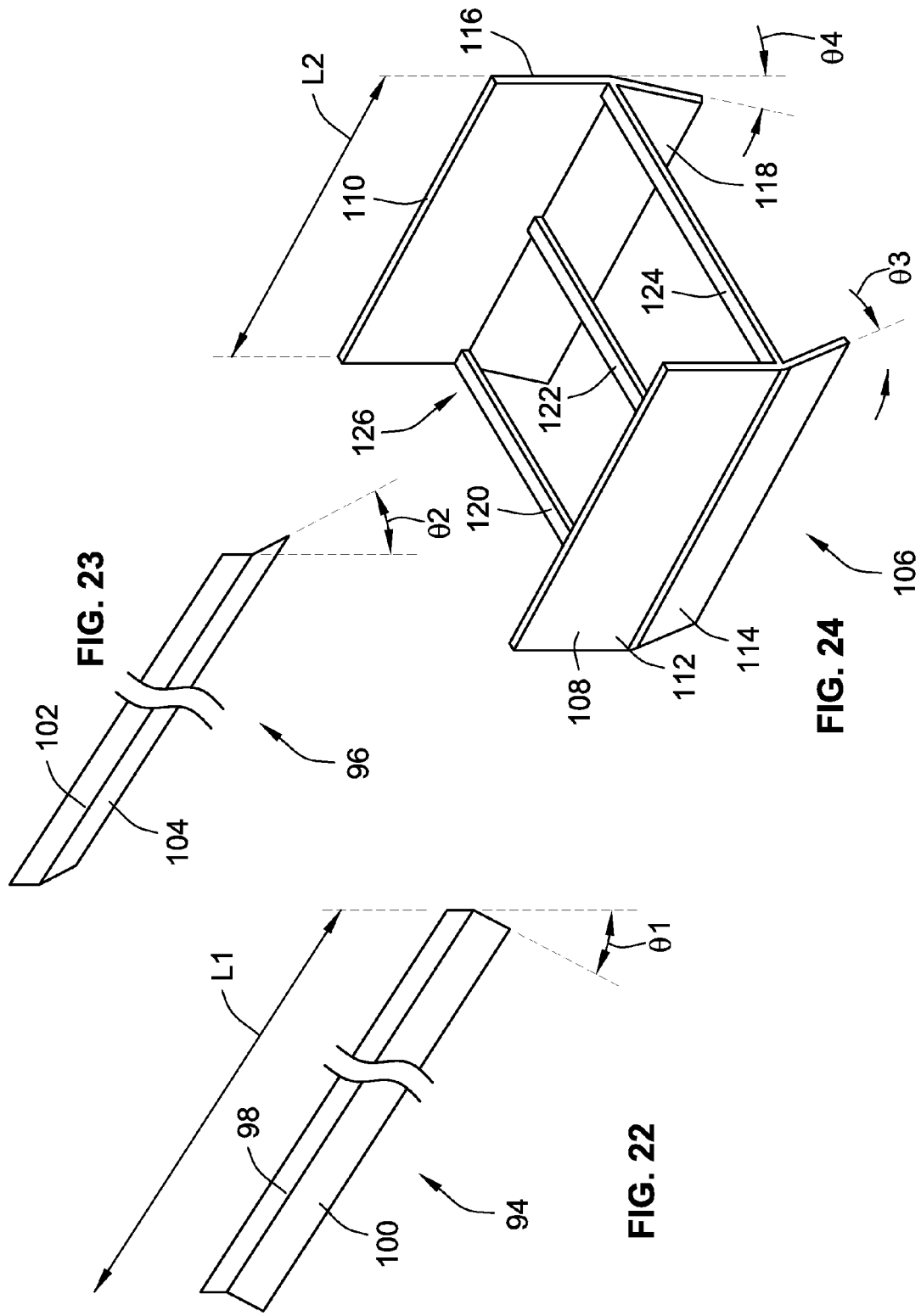

RECTANGULAR STACKED FLUTED FILTER CARTRIDGE

CROSS-REFERENCE TO RELATED PATENT APPLICATIONS

This patent application claims the benefit of U.S. Provisional Patent Application No. 61/784,015, filed Mar. 14, 2013, the entire teachings and disclosure of which are incorporated herein by reference thereto.

FIELD OF THE INVENTION

The present invention generally relates to fluid filtration, and more particularly to filter assemblies including filter housings and filter cartridges.

BACKGROUND OF THE INVENTION

Various systems require filtration of fluid prior to use of the fluid within the system. For instance, engines utilize air filtration systems for filtering air, the fluid, prior to using the air within the engine to combust a fuel. These filtration systems will typically utilize a housing that cooperates with a replaceable filter cartridge to filter the flowing fluid. When the filter cartridge becomes spent, such as when it has become full with removed dust particulates from the flowing fluid, the filter cartridge can be removed from the filter housing.

One particular type of filter cartridge used in air filtration is fluted filter media, which as used herein will be broad enough to include, but not limited to gathered, corrugated and tapered, fluted filter media. In one instance, the filter media stacked to form a block of filter media.

BRIEF SUMMARY OF THE INVENTION

One embodiment of the invention relates to a filter assembly. The filter assembly includes a filter housing. The filter housing defines an internal cavity, an inlet, and an outlet. The filter assembly includes a filter cartridge. The filter cartridge includes a stack of filter media. The stack of filter media includes an inlet flow face and an outlet flow face. The filter cartridge includes a frame coupled to the filter media. At least a portion of the filter cartridge is located within the internal cavity of the filter housing. The frame member defines an opening through which fluid may be directed to the inlet flow face of the filter media. The frame member includes a top surface. The inlet flow face is recessed below the top surface of the frame member. This may receive a projection from a housing.

An advantage of this design is that a simple rectangular stack (including substacks if desired) can be used with the media pack having a flat inlet face. Complex fluted media packs therefore need not be formed and fixture and tooling manufacture for the same are avoided.

In a particular embodiment, a projecting portion of the housing projects into the opening defined by the frame member. The frame member surrounds the projecting portion of the housing and provides clearance due to the inlet flow face being recessed below the top surface of the frame member.

In a more particular embodiment, the frame includes a first leg and a second leg. The first and second legs are located on opposite sides of the opening. The filter cartridge is located between the first leg and the second leg.

In one particular embodiment, the frame includes a rectangular top portion extending around the opening and defines a larger perimeter than the stack. The filter assembly also including a sealing member coupled to the top portion outside the legs and which extends around the opening. The sealing member is configured to seal with the filter housing to prevent fluid flow from bypassing the filter cartridge when the filter cartridge is installed in the filter housing. The sealing member is spaced above the inlet flow face.

In one particular embodiment, the filter cartridge includes a first end cap sealing one side of the filter media and overlapping with the frame member. The filter cartridge includes a second end cap sealing another side opposite the one side of the filter media. The second end cap overlapping with the frame member.

In one particular embodiment, the frame includes a plurality of ribs extending across the opening and below the top surface of the frame. The ribs run across and over the inlet flow face of the filter cartridge. The ribs may be recessed from the top surface of the frame member.

In one particular embodiment, the filter housing includes a first wall and a second wall. The first wall includes a first portion and a second portion. The second wall includes a first portion and a second portion. The first portion of the first wall and the first portion of the second wall are generally parallel. The second portion of the first wall and the second portion of the second wall converge towards one another proximate the outlet. The outlet flow face is flat. The filter cartridge has a guide mechanism projecting from the outlet flow face to engage the first and second portions.

In a more particular embodiment, the outlet flow face of the filter media is located between the first portion of the first wall and the first portion of the second wall when the filter cartridge is installed in the filter housing. The guide mechanism includes converging blades projecting from opposing sides of the stack and into a region between the second portions.

In one embodiment, the stack of filter media includes a first side and a second side opposite the first side. The first and second sides extend generally perpendicular to the inlet and outlet flow faces and generally parallel to one another. The frame member defines a first channel proximate the first side and a second channel proximate the second side. The filter cartridge further includes a first end wall extending generally over the first side of the filter media. The first end wall includes a central portion and an outer wall portion extending generally perpendicularly to the central portion. The outer wall portion includes an upper portion configured to be located in the first channel of the frame member. The filter cartridge includes a second end wall extending generally over the second side of the filter media. The second end wall includes a central portion and an outer wall portion extending generally perpendicularly to the central portion. The outer wall portion of the second end wall includes an upper portion configured to be located in the second channel of the frame member.

Another embodiment of the invention relates to a method of replacing a filter cartridge in a filter assembly. The filter assembly includes a filter housing. The filter housing defines an internal cavity, an inlet, and an outlet. The filter housing includes sidewalls proximate the outlet extending inwardly toward one another. The method includes providing a filter cartridge. The filter cartridge includes a fluted filter media and a frame member. The fluted filter media has an inlet flow face and an outlet flow face. The flutes of the fluted filter media extend from the inlet flow face to the outlet flow face. The outlet flow face is generally planar. The frame member includes a top portion having a top surface. The top portion extends from a first end to a second end. The top portion defines a central opening. The frame member is coupled to the fluted filter media such that fluid may be directed through the central opening to the inlet flow face of the filter media. The inlet flow face of the filter media is recessed below the top surface of the top portion. The method includes locating the filter cartridge in the internal cavity of the filter housing.

In a more particular embodiment, the sidewalls of the filter housing include a first section where the sidewalls extend generally parallel to one another. The outlet flow face of the filter media is located between the first section of the sidewalls when the filter cartridge is located in the internal cavity of the filter housing.

In another embodiment, the method includes removing a filter cartridge including removing a media pack arrangement with filter media having first and second opposite flow faces. The media pack arrangement has a first recessed central region in one of the flow faces prior to locating the filter cartridge in the internal cavity of the filter housing.

In one embodiment, the filter cartridge further includes a seal member coupled to the frame member. The step of locating the filter cartridge in the internal cavity of the filter housing includes locating the seal against the filter housing to prevent contaminated fluid from passing into the filter housing.

Another embodiment of the invention relates to a filter cartridge. The filter cartridge includes filter media. The filter media includes a generally rectangular inlet flow face, an outlet flow face, and opposite first and second and opposite third and fourth sides extending from the inlet flow face to the outlet flow face. The first, second, third, and fourth sides each extend generally perpendicularly to the inlet flow face and the outlet flow face. The first side extends along a first plane. The second side extends along a second plane. The third side extends along a third plane. The fourth side extends along a fourth plane. The filter cartridge includes a frame member coupled to the filter media. The frame member defines a generally rectangular opening through which fluid may pass to the inlet flow face. The frame member includes a top portion and first and second legs spaced apart from one another. The first leg is coupled to the first side of the filter media. The second leg is coupled to the second side of the filter media. The filter cartridge includes a first end cap sealing the third side of the filter media. The first end cap overlaps with the first leg and the second leg in at least one direction parallel to either the first, third, or fourth planes. The filter cartridge includes a second end cap. The second end cap seals the fourth side of the filter media. The second end cap overlaps with the first leg and the second leg in at least one direction parallel to either the second, third, or fourth planes.

In a more particular embodiment, the first end cap overlaps with the first leg and the second leg in a direction parallel to the first, third, and fourth planes.

In one embodiment, the second end cap overlaps with the first leg and the second leg in a direction parallel to the second, third, and fourth planes.

In one embodiment, the filter cartridge includes a seal extends under and around the top portion of the frame. The seal is configured to be located against a filter housing to prevent contaminated fluid from passing into the filter housing.

Another embodiment of the invention relates to a filter cartridge. The filter cartridge includes a stack of sheets of fluted filter media configured in a generally rectangular block having an inlet flow face and an outlet flow face. The filter cartridge also includes a frame coupled to the block of fluted filter media. The frame includes a top portion extending around and upwardly from the inlet flow face. The frame includes a pair of legs extending down toward the outlet flow face of the filter media. The frame defines a generally rectangular opening through which fluid may pass to the inlet flow face of the filter media. The top portion of the frame extends outwardly away from the filter media. The filter cartridge includes a seal member. The seal member extends around the filter media. The seal member is coupled to the portion of the top portion of the frame extending outwardly away from the filter media.

In one embodiment, the outlet flow face and the inlet flow face are each generally planar.

In one embodiment, the frame includes a connection portion extending between the top portion and the legs. The connection portion defines a pair of channels. The filter cartridge includes first and second end walls. Each end wall is configured to couple and/or is operably coupled to the filter media and to interface with one of the channels defined by the connection portion of the frame.

In one embodiment, the seal member is a foam pad prefilter.

In one embodiment, the frame member has a top surface. The inlet flow face of the filter media is recessed below the top surface of the frame member.

Another embodiment of the invention relates to a filter cartridge. The filter cartridge includes a stack of sheets of fluted filter media configured in a generally rectangular block having an inlet flow face and an outlet flow face. A prefilter is located upstream of the inlet flow face. A frame is coupled to the block of fluted filter media. The frame includes a top portion extending around and upwardly from the inlet flow face and the prefilter. A pair of legs extends past the prefilter and down toward the outlet flow face of the filter media. The frame defines a generally rectangular opening through which fluid may pass to the prefilter. The top portion of the frame extends outwardly away from the filter media. The prefilter the inlet flow face are recessed below a top surface of the frame.

In a more particular embodiment, the frame includes ribs extending across the generally rectangular opening. The prefilter is located between the ribs and the inlet flow face.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 11 is a bottom view of an embodiment of an end frame;

FIG. 18 is a perspective view of another embodiment of a filter cartridge; and

FIG. 19 is a cross-sectional view taken along the line 19-19 in FIG. 18;

FIG. 22 is a perspective view of an embodiment of a portion of a guide mechanism;

FIG. 23 is a perspective view of an embodiment of a portion of a guide mechanism;

FIG. 24 is a perspective view of another embodiment of a guide mechanism;

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE INVENTION

Figure 1:
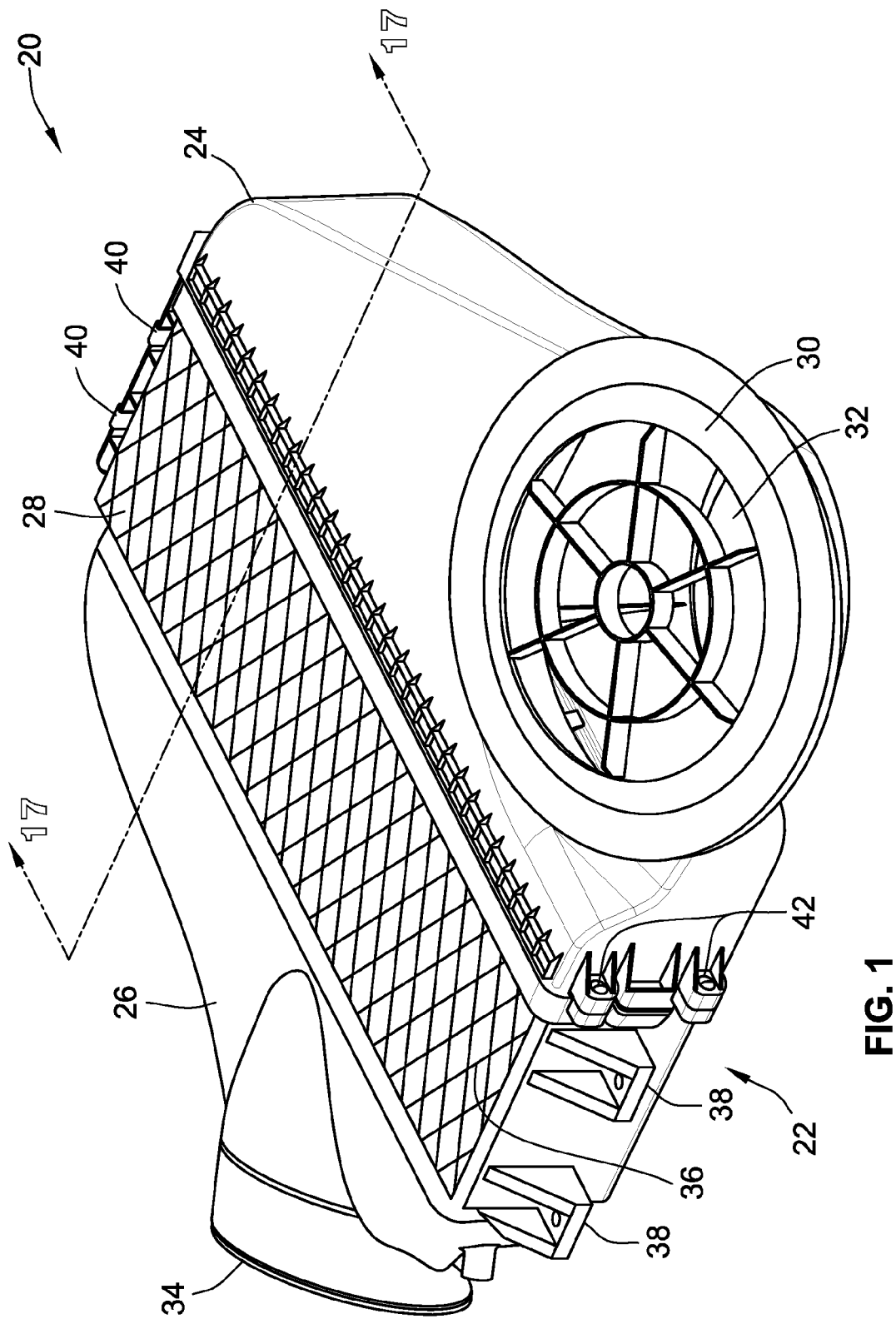
FIG. 1 is a perspective view of an embodiment of a filter assembly.

FIG. 1 illustrates a filter assembly 20 according to a first embodiment of the present invention. The filter assembly 20 is generally configured for removing contaminants and particulates from within a flowing fluid stream, such as an air stream. Typically, the air stream may be used for supplying air to an engine such as an internal combustion engine or turbine. However, embodiments of filter assemblies can be used for alternative systems, as well as for filtering other fluids, such as liquids. Generally, embodiments of filter assemblies include a housing and a filter cartridge. When the filter cartridge is spent, it is removed from the housing and replaced.

With further reference to FIG. 1, in one embodiment, the filter assembly 20 includes a housing 22 and a filter cartridge 23 (not illustrated in FIG. 1, see FIG. 2) internally received into the housing 22. The housing 22 includes an inlet portion 24 and an outlet portion 26. The inlet portion 24 and the outlet portion 26 are separable from one another (see, e.g., FIG. 2). The outlet portion 26 includes a body section 28 into which the filter cartridge 23 is located during installation.

With further reference to FIG. 1, the inlet portion 24 includes an inlet adapter 30 with an inlet aperture 32 therethrough. During operation, air to be filtered passes through the inlet aperture 32 to the interior of the housing 22. The adaptor 30 is configured to receive a bellows or other mechanism inside of an engine compartment of a vehicle, e.g., a truck, etc. The adapter 30 may be a preformed, plastic part.

During operation, unfiltered air passes through the inlet aperture 32, through the inlet portion 24 and toward the outlet portion 26 with the air passing through the filter cartridge 23 to filter the air. The filtered air exits the filter assembly 20 through an outlet 34.

With further reference to FIG. 1, the outlet portion 26 includes a rib pattern portion 36. The rib pattern portion 36 may provide strengthening of the surface of the outlet portion 26. The opposite side of the outlet portion 26 (not illustrated in FIG. 1) also includes a rib pattern portion.

As is illustrated in FIG. 1, the outlet portion 26 provides mounting posts 38 and mounting brackets 40 configured to mount the housing 22, e.g., in a vehicle. The outlet portion 26, upon mounting, is fixed in place and is not movable with respect to the mounting, e.g., with respect to the vehicle, without dismounting the housing 22, while the inlet portion 24 is removable to provide access to the interior of the housing 22.

Bolts 42 are configured to secure the inlet portion 24 to the outlet portion 26, e.g., to nut plates of the outlet portion 26. In other embodiments, other suitable fasteners and/or coupling mechanisms may be used. When the inlet portion 24 is to be removed from the outlet portion 26, the bolts 42 may be loosened or removed to allow the inlet portion 24 to be moved away from the outlet portion 26, as is illustrated in FIG. 2.

Figure 2:
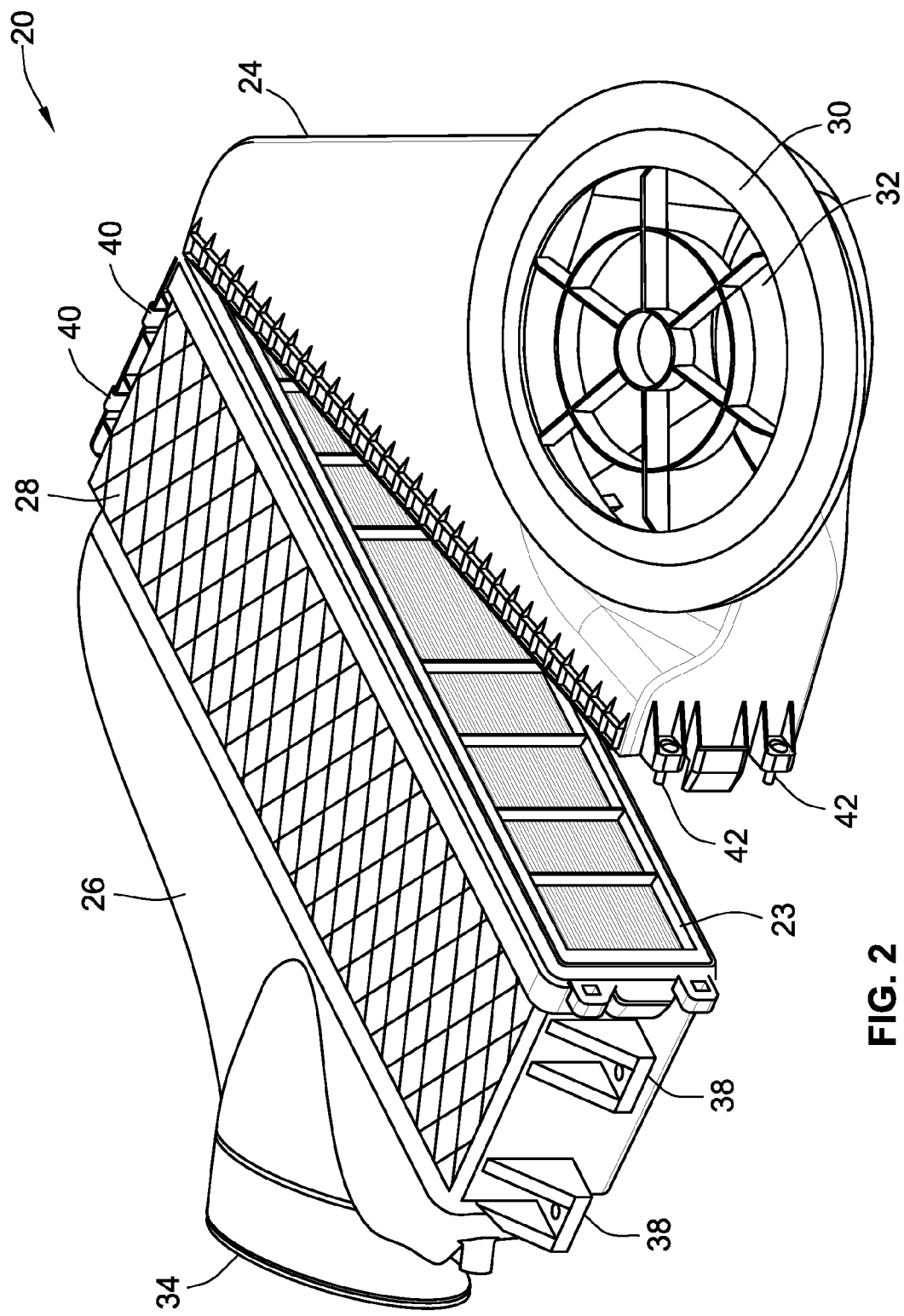
FIG. 2 is a perspective view of an embodiment of a filter assembly with a housing in a partially opened configuration.
Figure 3:
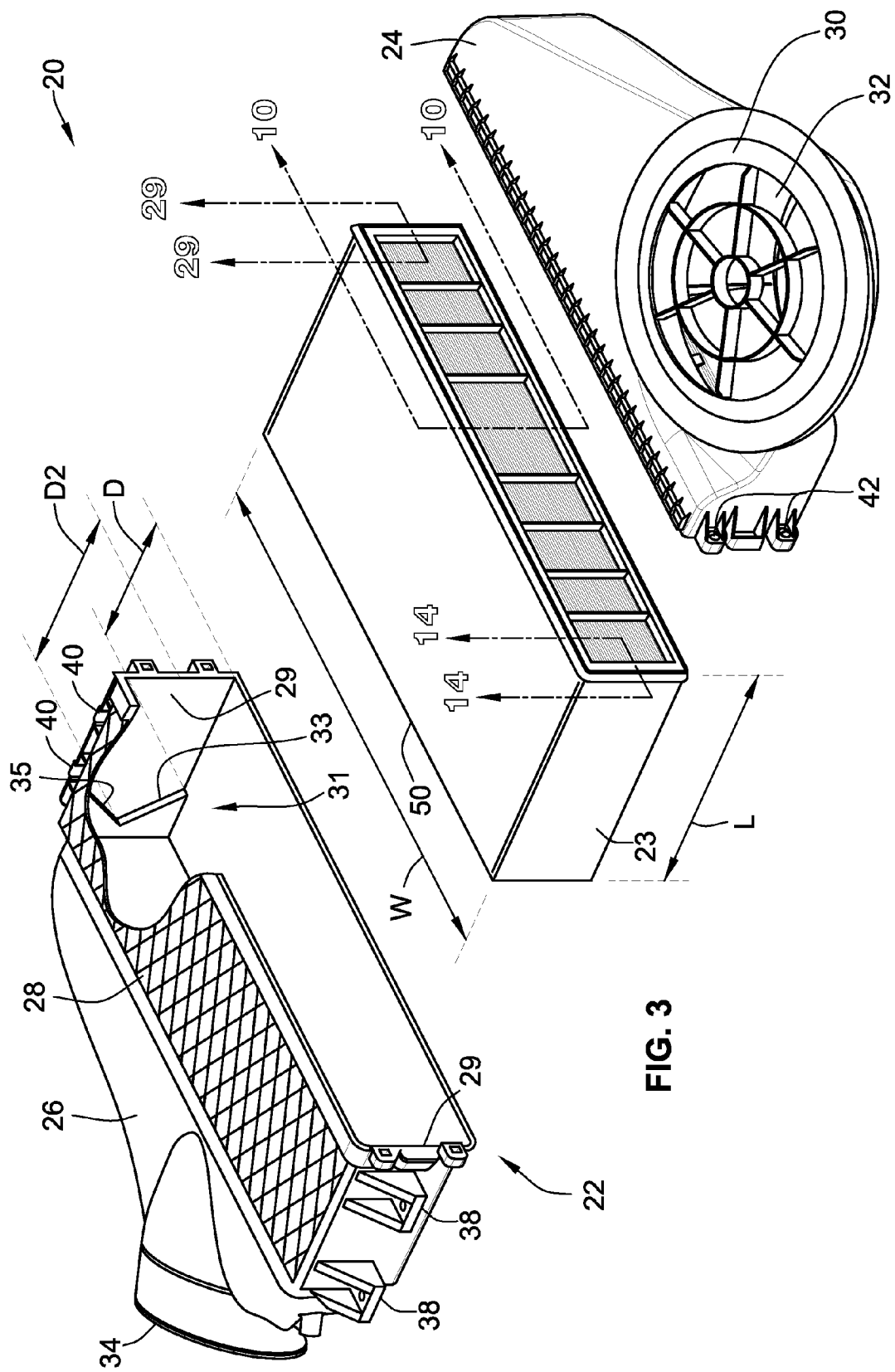
FIG. 3 is a perspective view of an embodiment of a filter assembly in an exploded configuration.

With further reference to FIG. 2, the housing 22 includes a releasable hinge configured to allow pivotal displacement of the inlet portion 24 relative to the outlet portion 26 (as illustrated in FIG. 2) and detachment of the inlet portion 24 from the outlet portion 26 (as illustrated in FIG. 3).

With reference to FIG. 3, with the inlet portion 24 removed from the outlet portion 26, the filter cartridge 23 may be removed from or located within the filter housing 22. In FIG. 3, a portion of the body section 28 is shown cut away to illustrate interior features of the housing 22. Extending inwardly from each of the sidewalls 29 of the body section 28 is an angular support feature 31 (only one support feature 31 visible in FIG. 3). The support feature 31 includes first and second support walls 33 and 35. The support walls 33 and 35 extend angularly downwardly away from the inlet portion 24 and toward one another generally towards an apex or junction region.

Figure 4:
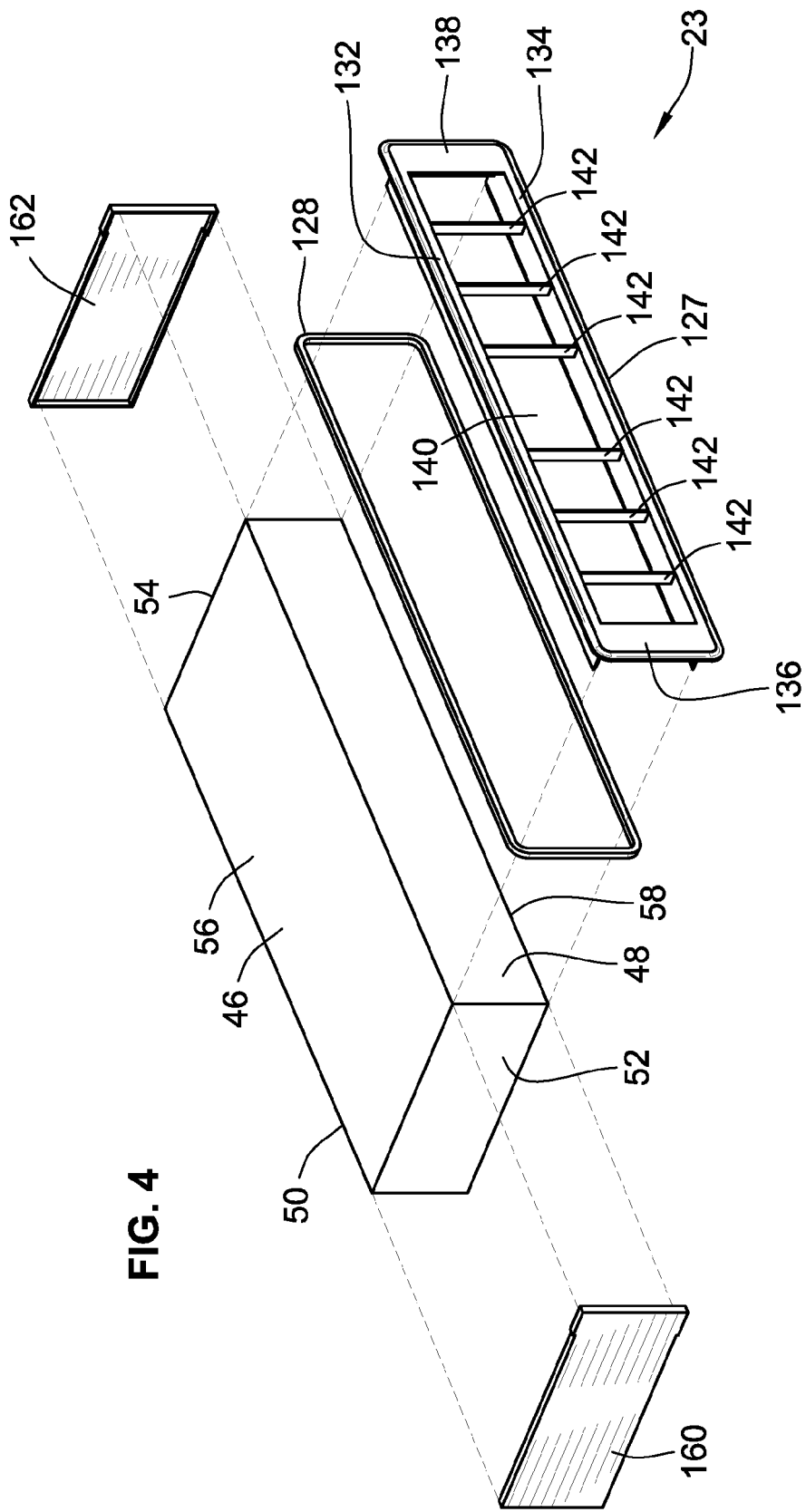
FIG. 4 is an exploded view of an embodiment of a filter cartridge.

FIG. 4 illustrates an exploded view of an embodiment of a filter cartridge 23. The filter cartridge 23 includes a stack of filter media 46. As illustrated in FIG. 4, the stack of filter media 46 is configured in a generally rectangular block. The filter media 46 includes a flat inlet flow face 48 and a flat outlet flow face 50. As such, no offsetting or complex configuration of the media is needed. Instead, a simple rectangular stack can be used. The inlet and outlet flow faces 48 and 50 are generally parallel to one another and generally perpendicular to the direction of fluid flow. Each of the inlet flow face 48 and the outlet flow face 50 is generally planar. The filter media 46 extends from a first end 52 to a second end 54 in a direction generally perpendicular to the direction of fluid flow and perpendicular to the inlet 48 and outlet 50 flow faces and from a first sidewall 56 to a second sidewall 58. The inlet and outlet flow faces 48 and 50 are generally flat and extend generally perpendicular to the sidewalls 56 and 58 and ends 52 and 54.

The filter media 46 is preferably fluted media. In one embodiment, the fluted media is corrugated media. In another embodiment, the flutes of the fluted media are formed by folding. In other embodiments, the fluted media may be formed by any suitable method or mechanism. In other embodiments, the filter media may be any other suitable type of media. The filter media 46 may include a plurality of inlet flutes and plurality of outlet flutes. The inlet flutes are open proximate the inlet flow face 48 and sealed proximate the outlet flow face 50, e.g., sealed with a bead of adhesive, etc. The outlet flutes are sealed proximate the inlet flow face 48, e.g., sealed with a bead of adhesive, etc., and open proximate the outlet flow face 50. For example, a stack of fluted media can be accomplished in accordance with U.S. Pat. No. 5,820,646, the entire disclosure of which is incorporated herein by reference.

Figure 5:
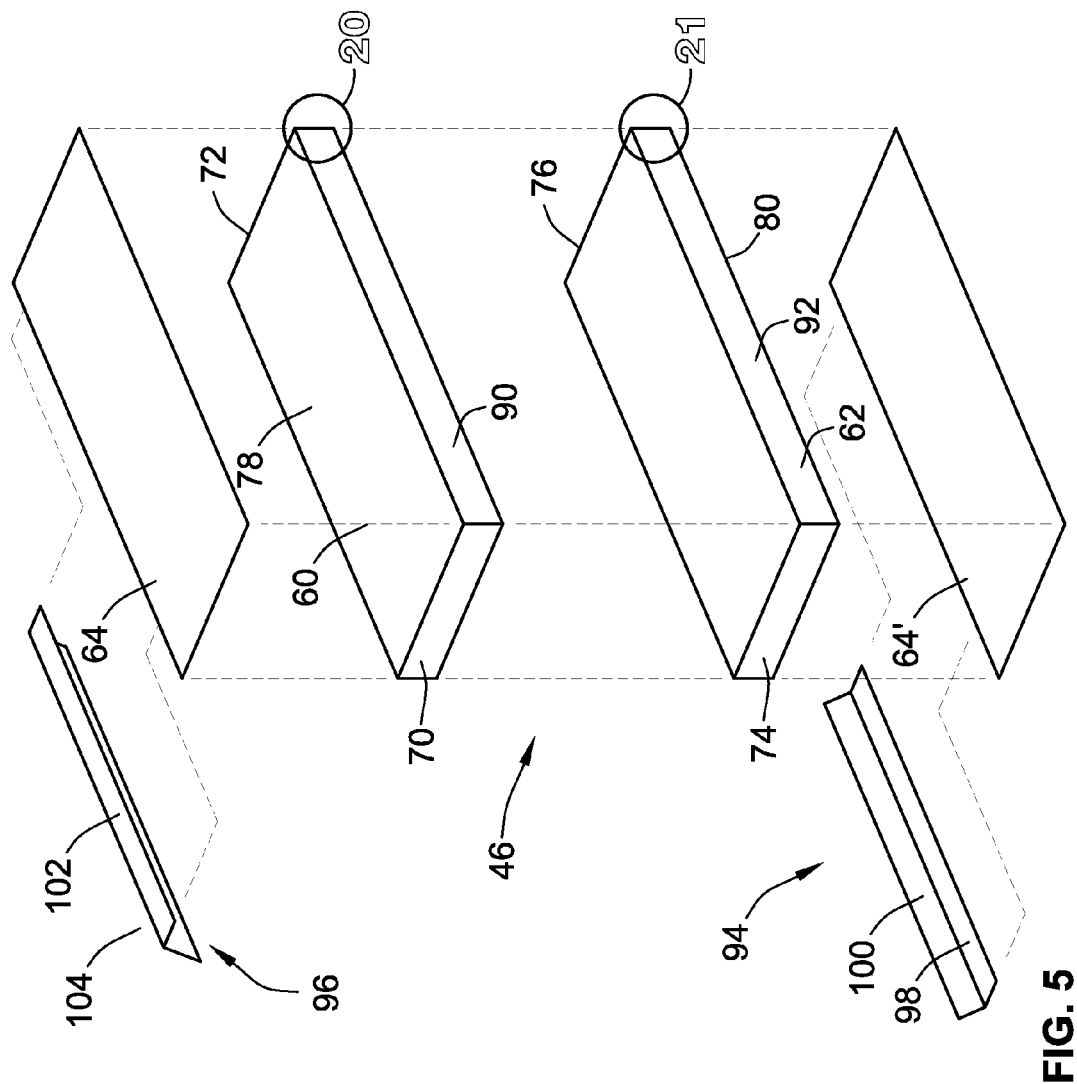
FIG. 5 is an exploded view of an embodiment of a stack of filter media, a portion of protective material, and an embodiment of a guide mechanism.

With reference to FIG. 5, an exploded view of an embodiment of a stack of filter media 46 is illustrated. The stack of filter media 46 includes a first stack of filter media 60 and a second stack of filter media 62. The first and second stacks 60 and 62 each include a plurality of generally rectangular sheets 66 and 68 of fluted media (see FIGS. 20 and 21). The generally rectangular peripheries of the sheets 66 and 68 are aligned to form rectangular stacks with the opposite sides 70, 72 and 74, 76 of the stacks 60 and 62 being generally parallel with one another and generally perpendicular to the upper surface 78 of the first stack 60 and the lower surface 80 of the second stack 62.

Figure 20:
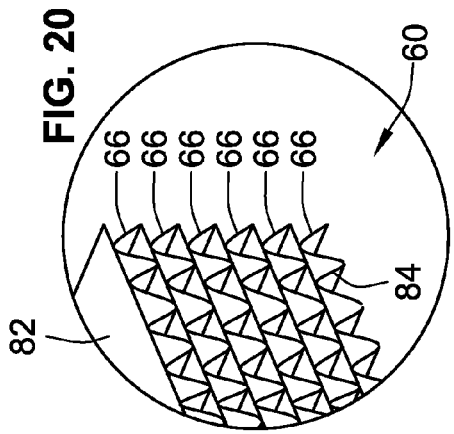
FIG. 20 is a detail view of the area 20 in FIG. 5.

With reference to FIG. 20, in one embodiment, each of the sheets 66 of the first stack 60 includes a backing sheet 82 and a fluted sheet 84. The flutes project in a generally wave-like pattern. At one end a sealing bead between the fluted sheet 84 and the backing sheet 82 seals one end of alternating and/or adjacent ones of the flutes. At the other end, a sealing bead between the backing sheet 82 and a fluted sheet of another sheet 66 seals one end of alternating and/or adjacent flutes. The first stack 60 includes adjacent flutes having alternating first closed ends and second closed ends to provide for substantially straight through flow of the fluid between the upstream flow and the downstream flow. With this arrangement, the fluid to be filtered must pass through the filter media trapping dust carried thereby, and then pass into an adjacent flute open at the outlet end for exit.

The sheets 66 are stacked in the same orientation with the first, generally flat sides 82 of the sheets 66 facing upwardly. In one embodiment, the sheets 66 are coupled together to form the first stack 60. The sheets 66 are coupled together with adhesive.

Forming the filter media 46 with a first stack 60 and a second stack 62 coupled together with adhesive may add strength to the filter media 46 and may prevent telescoping of the stack of filter media 46, e.g., movement of the sheets 66 and 68 relative to one another, etc. Alternatively, a single stack of filter media may be used.

Figure 21:
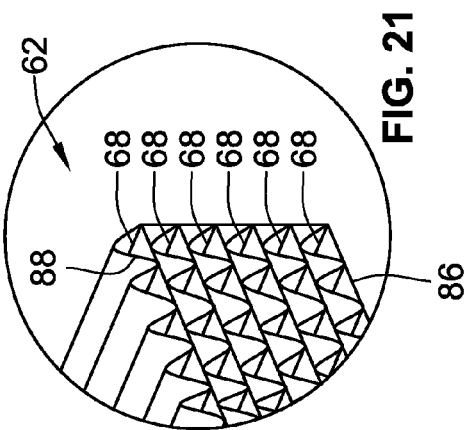
FIG. 21 is a detail view of the area 21 in FIG. 5.

With reference to FIG. 21, in one embodiment, each of the sheets 68 of the second stack 62 includes a backing sheet 86 and a fluted sheet 88. The flutes project in a generally wave-like pattern. At one end a sealing bead between the fluted sheet 88 and the backing sheet 86 seals one end of alternating ones of the flutes. At the other end, a sealing bead between the backing sheet 86 a fluted sheet of another sheet 68 seals one end of alternating flutes. The second stack 62 includes adjacent flutes having alternating first closed ends and second closed ends to provide for substantially straight through flow of the fluid between the upstream end and the downstream end, with flow having to pass through either one of the backing sheets or fluted sheets.

The sheets 68 are stacked in the same orientation with the backing sheet 86 of the sheets 68 facing downwardly. The sheets 68 may be coupled together to form the second stack 62. The sheets 68 may be coupled together with adhesive.

With further reference to FIGS. 5, 20 and 21, in one embodiment, the first stack 60 and the second stack 62 are coupled together to form the stack of filter media 46. The first stack 60 has an inlet flow face 90. The inlet flow face 90 is generally perpendicular to the opposite sides 70 and 72 of the first stack 60. The inlet flow face 90 is also generally perpendicular to the upper surface 78 of the first stack 60. The second stack 62 also has an inlet flow face 92. The inlet flow face 92 is generally perpendicular to the opposite sides 74 and 76 of the second stack 62. The inlet flow face 92 is also generally perpendicular to the lower surface 80 of the second stack 62. The inlet flow faces 90 and 92 together form the combined flat or overall inlet flow face 48 of the stack of filter media 46 (see FIG. 4), when the stacks 60 and 62 are coupled together to form the stack of filter media 46.

With reference to FIGS. 4 and 5, in one embodiment, the side 70 of the first stack 60 and the side 74 of the second stack 62 together form the first end 52 of the stack of filter media 46. The side 72 of the first stack 60 and the side 76 of the second stack 62 together form the second end 54 of the stack of filter media 46. The sides 52 and 54 are generally parallel to one another and generally perpendicular to the inlet 48 and outlet 50 flow faces.

Figure 25:
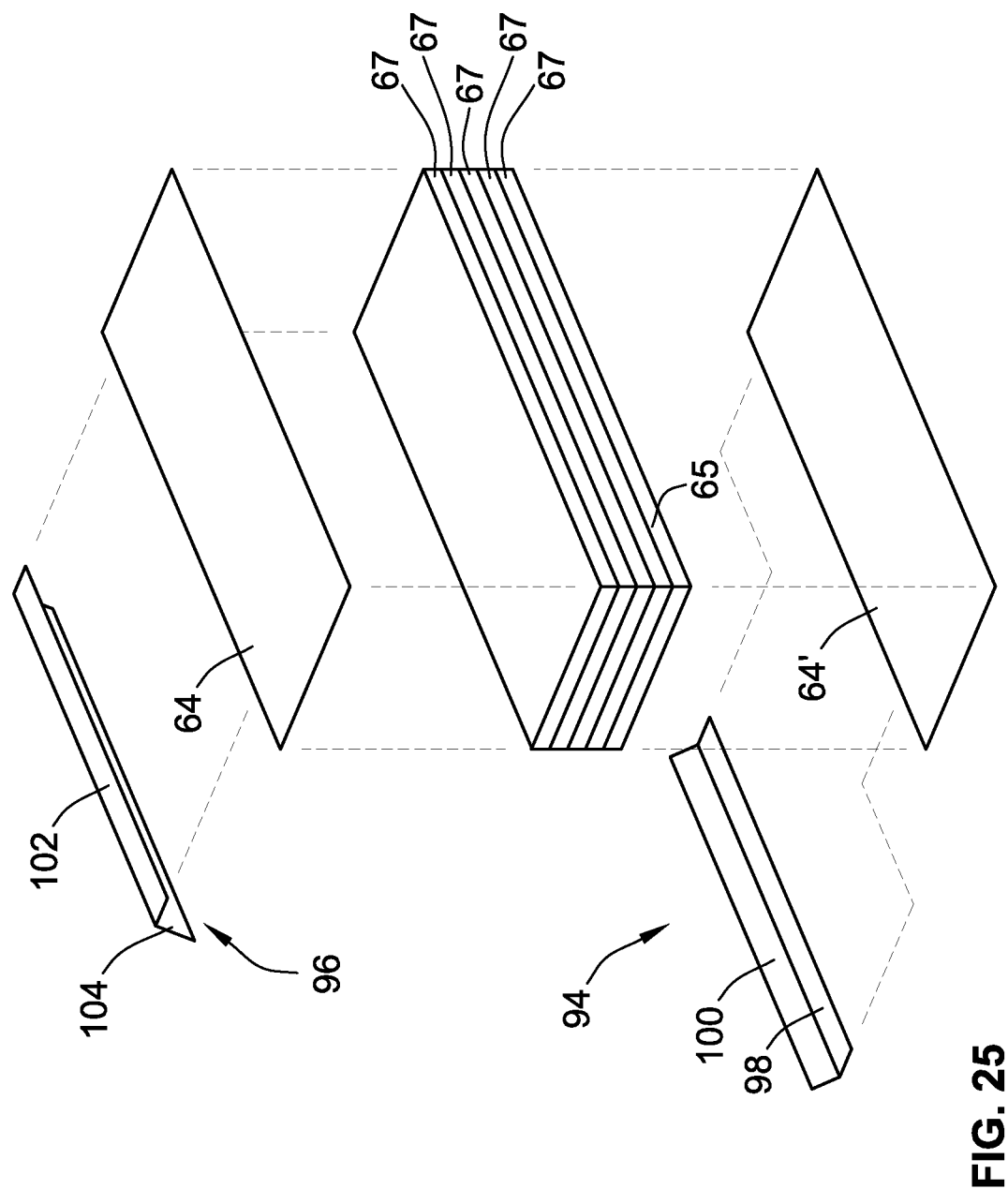
FIG. 25 is a view of another embodiment of a stack of filter media, a portion of protective material, and an embodiment of a guide mechanism.

With reference to FIGS. 4 and 25, in another embodiment, the stack of filter media 46 includes a single stack of filter media 65. The single stack of filter media 65 includes a plurality of generally rectangular sheets 67 of fluted media (see FIG. 26). The generally rectangular peripheries of the sheets 67 are aligned to form the rectangular stack of filter media 46.

Figure 26:
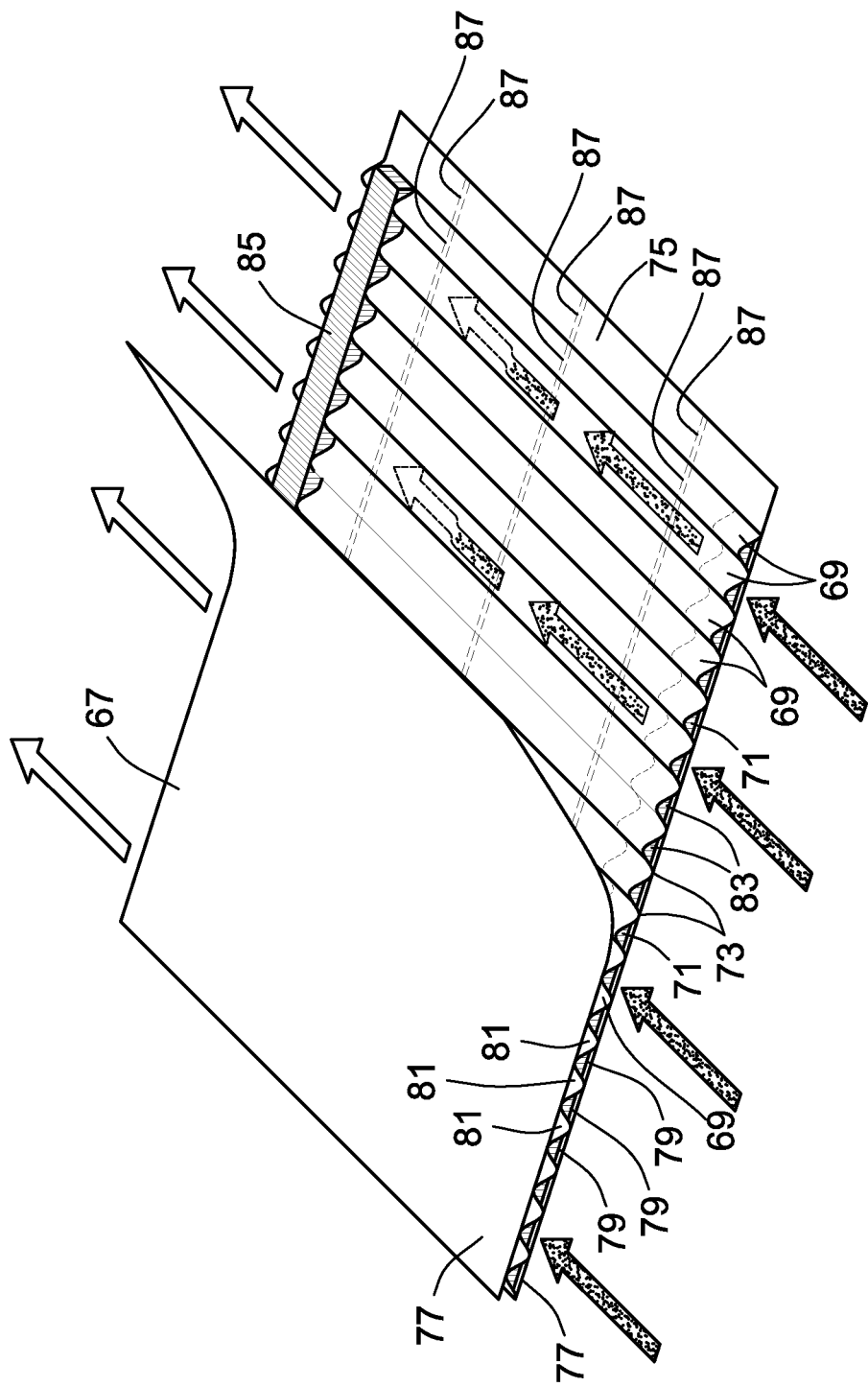
FIG. 26 is a perspective view of an embodiment of a sheet of double-faced fluted filter media.

FIG. 26 illustrates one embodiment of a sheet 67 of filter media. A portion of a layer of double-faced permeable fluted filter media 67 is illustrated. The sheet 67 includes flutes 69 that form a corrugated-type material. The flutes 69 are formed by a center fluting sheet 75 formed into peaks 71 and troughs 73 between a facing sheets 77. The peaks 71 and troughs 73 divide the flutes into an upper row and a lower row. In the configuration shown in FIG. 26, the upper flutes form flute chambers 81 closed at the downstream end, while upstream closed end flutes 79 are the lower row of flute chambers. The fluted chambers 79 are closed by a first end bead 83 filling a portion of the upstream end of the flute between the fluting sheet 75 and the lower facing sheet 77. Similarly, a second end bead 85 closes the downstream end of alternating flutes 81. Adhesive tacks 87 connect the peaks 71 and troughs 73 of the flutes 69 to the facing sheets 77. In one embodiment, the adhesive of the tacks 87 is placed only at the apexes of the peaks 71 and troughs 73, rather than as a continuous bead, as shown in FIG. 26. The minimal amount of adhesive keeps the chambers of the flutes open to accept increased fluid flow. The flutes 69 and end beads 83 and 85 may provide a filter cartridge which is structurally self-supporting.

When filtering, unfiltered fluid enters the flute chambers 81 which have their upstream ends open as indicated by the shaded arrows. Upon entering the flute chambers 81, the unfiltered fluid flow is closed off by the second end bead 85. Therefore, the fluid is forced to proceed through one of the fluting sheets 75 or face sheets 77.

With further reference to FIG. 5, in one embodiment, upon forming the stack of filter media 46, in one embodiment, a protective wrap 64, is coupled to and generally covers one side 78 of the first stack 60. The wrap 64 may be a sheet of paper material or plastic material. Additionally, in one embodiment, another wrap 64', is coupled to and generally covers an opposite side 80 of the second stack 62.

With reference to FIG. 4, in another embodiment, the first end 52, the second end 54, the first sidewall 56, and the second sidewall 58 of the stack of filter media 46 are covered with a protective outer wrapper, e.g., the stack of filter media 46 is wrapped with an outer wrapper extending around the first end 52, the first sidewall 56, the second end 54, and the second sidewall 58 of the stack of filter media 46. In one embodiment, the outer wrapper does not extend over the inlet flow face 48 or the outlet flow face 50 of the filter media 46.

With further referent to FIG. 4, in one embodiment, the stack of media 46 is deep pleated media. In any of the embodiments described herein whether pleated or fluted, the stack of media 46 may extend a depth between the inlet flow face 48 and the outlet flow face 50 of at least approximately 6 inches; and the stack of media 46 may extend a length between the first end 52 and the second end 54 of between approximately 12 inches to approximately 36 inches; and the stack of media may extend a width between the first sidewall 56 and the second sidewall 58 of between approximately three inches and approximately nine inches.

With reference to FIGS. 5, 22 and 23, a guide mechanism, illustrated in FIG. 5 as first and second guides 94 and 96, is provided. The first guide 94 includes a first wall portion 98 and a second angular wall portion 100 extending from the first wall portion 98. The first wall portion 98 extends generally along a first plane, while the second angular wall portion 100 extends generally along a second plane non-parallel and non-coplanar with the first plane. The first wall portion 98 and the second angular wall portion 100 preferably extend generally the same length. In another embodiment, the first wall portion 98 extends a length shorter than the second angular wall portion 100.

The first wall portion 98 is coupled to the wrap 64' proximate the outlet flow face 50, coupling the first guide 94 to the stack of media 46. The first wall portion 94 extends generally parallel to the lower surface 80 of the second stack 62. The second angular wall portion 100 extends non-parallel to the lower surface 80 of the second stack 62 forming an angle θ1 with the plane along which the first wall portion 98 extends, with the angle θ1 is less than 90°. In one embodiment, the first guide 94 extends along the lower surface 80 of the second stack 62 from a location proximate the side 74 of the second stack 62 to a location proximate the side 76 of the second stack 62.

With reference to FIGS. 5 and 23, in one embodiment, the second guide 96 includes a first wall portion 102 and a second angular wall portion 104 extending from the first wall portion 102. The first wall portion 102 extends generally along a first plane, while the second angular wall portion 104 extends generally along a second plane non-parallel and non-coplanar with the first plane. The first wall portion 102 and the second angular wall portion 140 preferably extend generally the same length. In another embodiment, the first wall portion 102 extends a length shorter than the second angular wall portion 104.

As shown, the first wall portion 102 can be coupled to the wrap 64, proximate the outlet flow face 50 of the media 46 coupling the second guide 96 to the stack of media 46. The first wall portion 102 extends generally parallel to the upper surface 78 of the first stack 60. The second angular wall portion 104 extends non-parallel to the upper surface 78 of the first stack 60 forming an angle θ2 with the plane along which the first wall portion 102 extends, with the angle θ2 being less than 90°. The second guide 96 extends along the upper surface 78 of the first stack 60 from a location proximate the side 70 of the first stack 60 to a location proximate the side 72 of the first stack 60. The first guide 94 and the second guide 96 are generally the same length and are aligned on opposite sides of the stack of media 46. The guides 94 and 96 may provide for guidance of the filter cartridge 23 when the filter cartridge 23 is being located in the housing 22, as will be further discussed below.

With reference to FIG. 24, an alternate embodiment of a guide mechanism, illustrated as a guide 106, is provided. The guide 106 includes a first guide portion 108, a second guide portion 110 spaced apart from the first guide portion 108. The first guide portion 108 includes a first wall portion 112 and a second angular wall portion 114 extending downwardly from the first wall portion 112. The first wall portion 112 extends along a first plane, while the second angular wall portion 114 extends along a second plane non-parallel to and non-co-planar with the first plane. The second guide portion 110 includes a first wall portion 116 generally parallel with the first wall portion 112 and a second angular wall portion 118 extending downwardly from the first wall portion 116. The first wall portion 116 extends along a first plane, while the second angular wall portion 118 extends along a second plane non-parallel to and non-co-planar with the first plane.

With further reference to FIG. 24, the guide 106 includes a connecting portion, illustrated in FIG. 24 as a plurality of bridges in the form of posts 120, 122, and 124, extending between the first guide portion 108 and the second guide portion 110. The post 120 extends proximate a first end of the first guide portion 108 from the first guide portion 108, proximate the location where the first wall portion 112 and the second angular wall portion 114 meet, to the second guide portion 110, proximate the location where the first wall portion 116 and the second wall portion 118 meet. The post 122 extends generally parallel to the post 120 between the post 120 and the post 124, from the first guide portion 108, proximate the location where the first wall portion 112 and the second angular wall portion 114 meet, to the second guide portion 110, proximate the location where the first wall portion 116 and the second wall portion 118 meet. The post 124 extends proximate a second end of the first guide portion 108 opposite the first end of the first guide portion from the first guide portion 108, proximate the location where the first wall portion 112 and the second angular wall portion 114 meet, to the second guide portion 110, proximate the location where the first wall portion 116 and the second wall portion 118 meet.

The first wall portion 112 of the first guide portion 108, the first wall portion 116 of the second guide portion 110 and the posts 120, 122, and 124 define a channel 126 configured to receive the outlet flow face 50 of the filter media 46. The first wall portion 112 is configured to be coupled to the first sidewall 56 of the filter media 46 and the first wall portion 116 is coupled to the second sidewall 58 of the filter media 46. The second angular wall portions 114 and 118 may provide for guidance for the filter cartridge when the filter cartridge is being located in the housing 22, as will be further discussed below.

Figure 6:
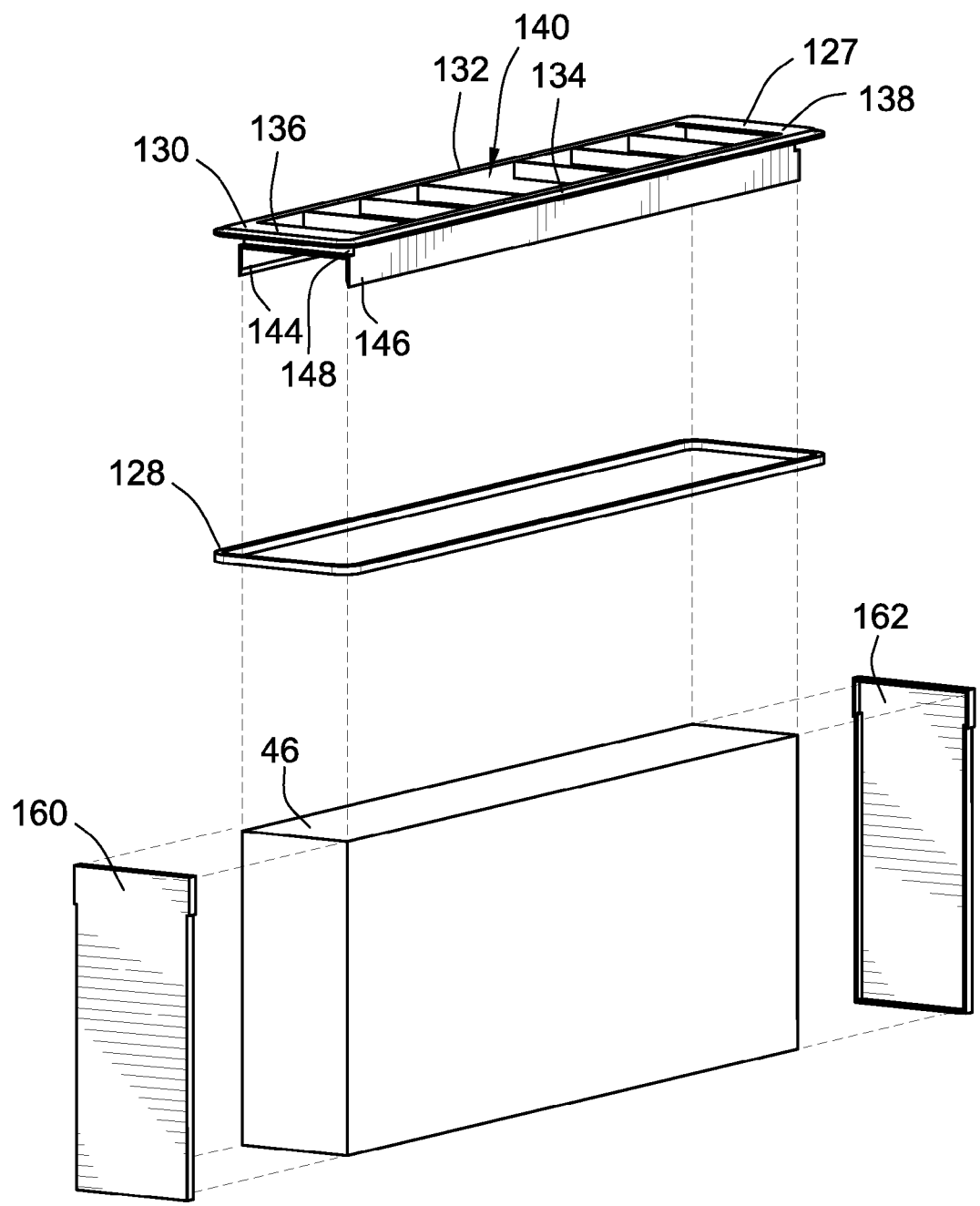
FIG. 6 is an exploded view of an embodiment of a filter cartridge.
Figure 7:
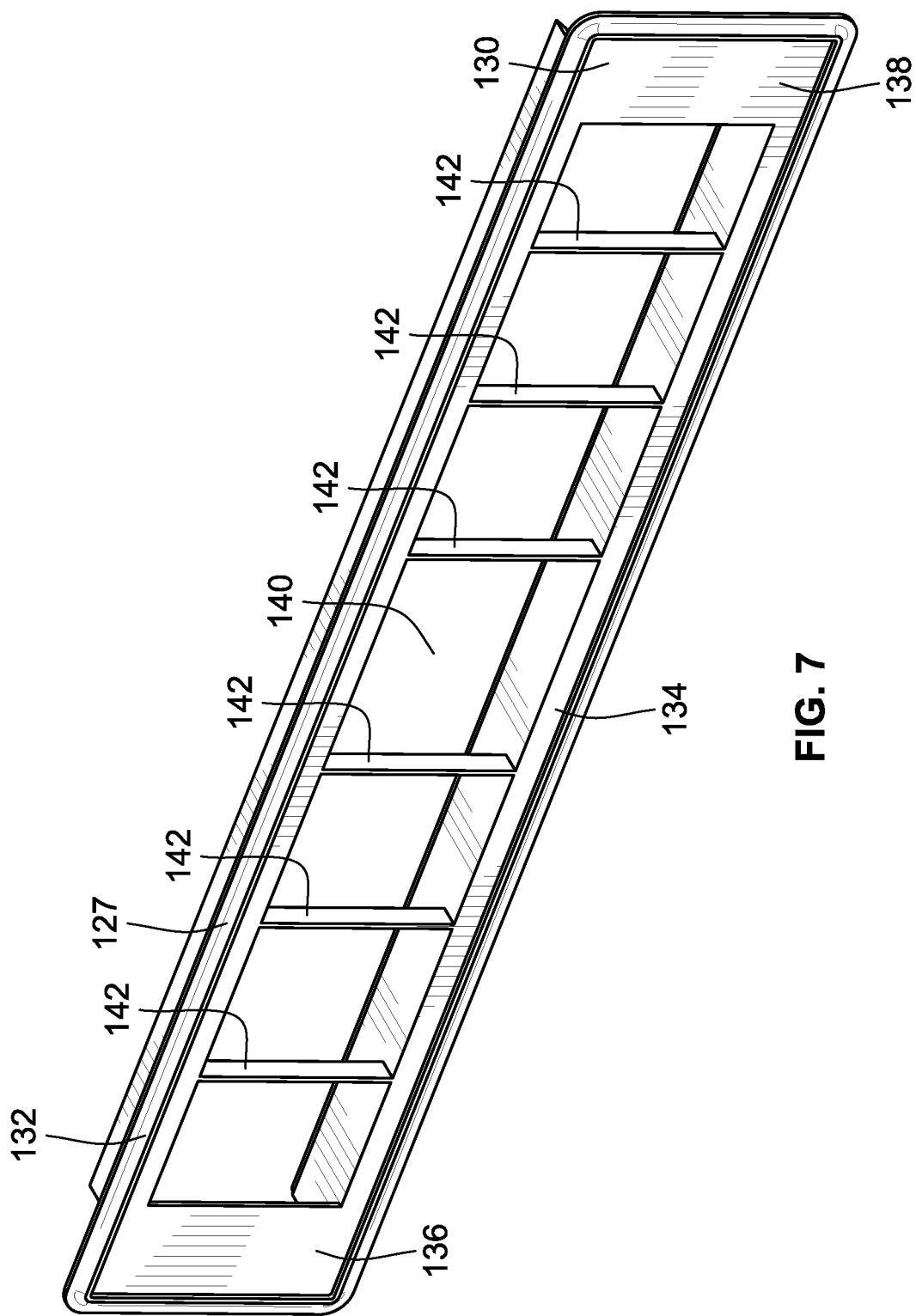
FIG. 7 is an top perspective view of an embodiment of an end frame.

With further reference to FIG. 4, the filter cartridge 23 includes a frame, illustrated in FIG. 4 as an end frame 127. The filter cartridge 23 also includes a seal 128. As illustrated in FIG. 6, the end frame 127 includes a top portion 130 that is configured to be placed over the inlet face of the fluted media stack. The frame 127 may include first and second generally parallel sides 132 and 134 and third and fourth sides 136 and 138 generally parallel to one another and generally perpendicular to sides 132 and 134. As illustrated in FIGS. 4 and 7, the top portion 130 extends around a generally rectangular open center 140 through which fluid flows to the inlet flow face 48 (see FIG. 4) of the filter media 46. Extending from one side 132 to the other side 134 across the generally rectangular open center 140 are a plurality of ribs 142. When the end frame 127 is assembled with the stack of filter media 46, the ribs 142 extend from the top surface of the end frame 127 downwardly to the inlet flow face 48 of the filter media 46. The ribs 142 provide support and also protect the inlet flow face.

Figure 8:
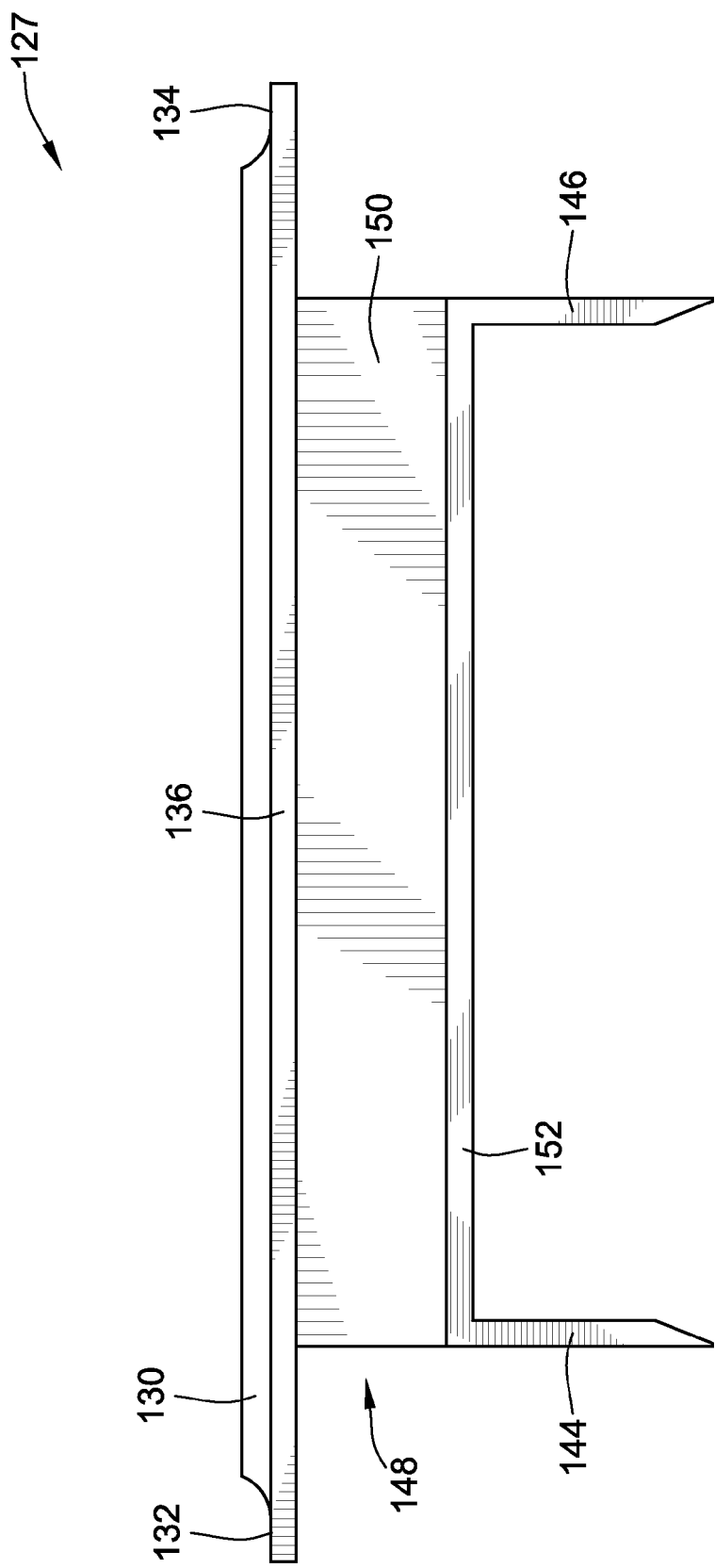
FIG. 8 is an end view of an embodiment of an end frame.

With reference to FIGS. 6 and 8, the end frame 127 also includes a first leg 144 and a second leg 146 extending along longitudinal sides of the media pack. The second leg 146 is spaced apart from the first leg 144 on the opposite side of the open center 140. The first leg 144 extends along the same side of the open center 140 as the side 132 of the top portion 130. The second leg 146 extends along the other side of the open center 140, e.g., same side as side 134 of the top portion 130.

Figure 9:
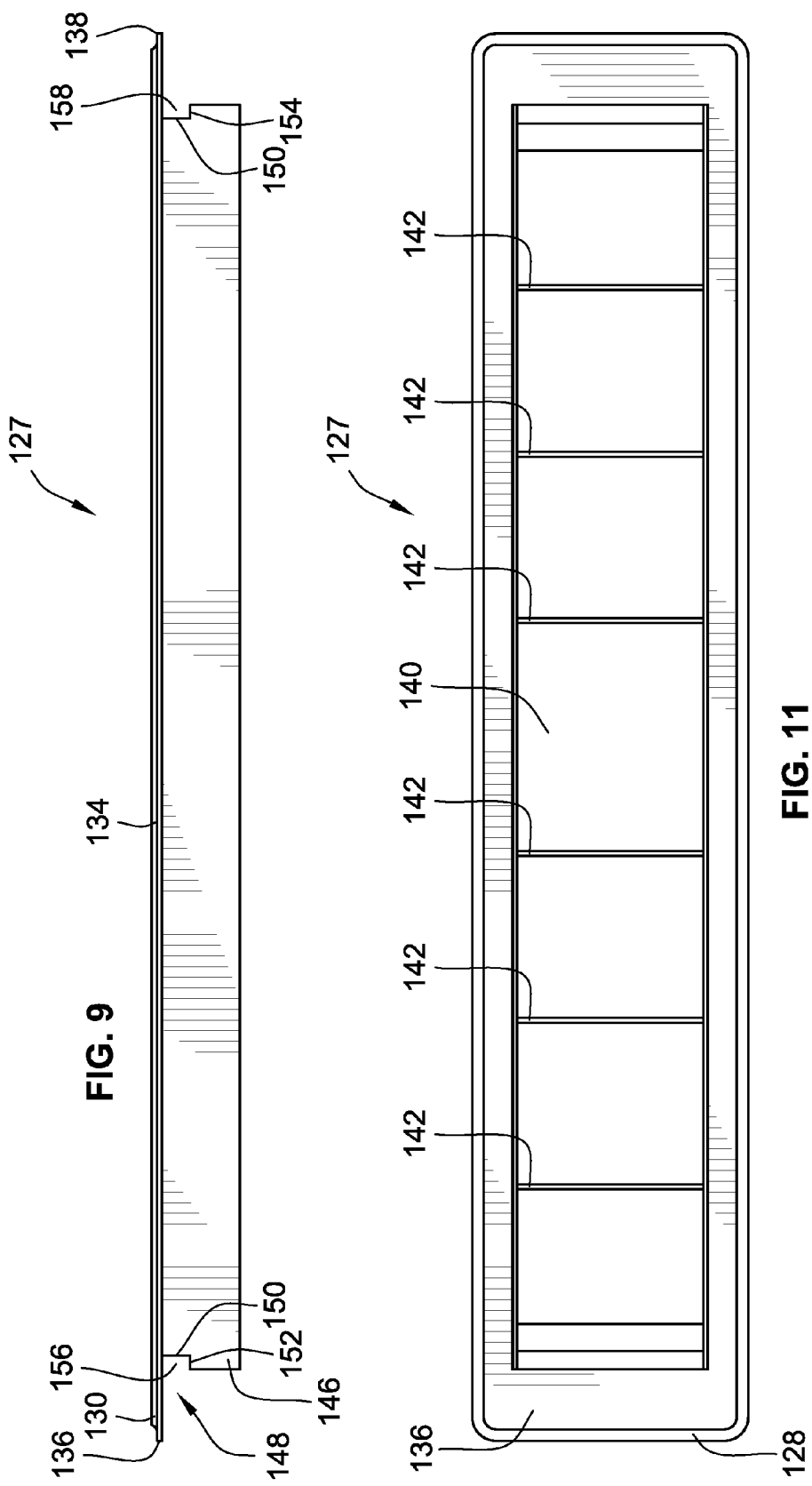
FIG. 9 is a side view of an embodiment of an end frame.

With reference to FIGS. 6, 8, and 9, the end frame 127 also includes a connection portion 148 on each opposed end (e.g., narrow ends). Portion 148 extends between the top portion 130 and the legs 144 and 146. The connection portion 148 includes a generally vertical wall portion 150 extending downwardly from the interior periphery of the top portion 130 and extends around the generally rectangular open center 140. The connection portion 148 also includes first horizontal wall portion 152 extending generally perpendicularly from the vertical wall portion 150 distal from the top portion 130 proximate the third side 136 of the top portion 130. The connection portion 148 also includes a second horizontal wall portion 154 extending generally perpendicularly from the vertical wall portion 150 distal from the top portion 130 proximate the fourth side 138 of the top portion 130. The inlet flow face 48 of the filter media 46 is configured to be received between the first leg 144 and the second leg 146 and coupled to the end frame 127, with opposite ends of the inlet flow face 48 of the filter media 46 contacting the first and second horizontal wall portions 152 and 154 respectively.

Thus legs 144 and 146 and connection portions 148 generally surround the media pack stack, while the top portion 130 is over the inlet face with a border extension beyond the periphery of the media pack stack.

In one embodiment, the end frame 127 is coupled to the stack of filter media 46 by adhesive. For example, the end frame may be coupled with urethane, e.g., SIKAFLEX® urethane, available from Sika Corporation U.S., etc.

As illustrated in FIG. 9, the top portion 130, the generally vertical wall portion 150 and the first horizontal wall portion 152 define a first channel 156 configured to receive a portion of a first end cap, as will be further described below. Similarly, the top portion 130, the generally vertical wall portion 150 and the second horizontal wall portion 154 define a second channel 158 on the opposite side of the end frame 127 configured to receive a portion of a second end cap, as will be further described below.

Figure 10:
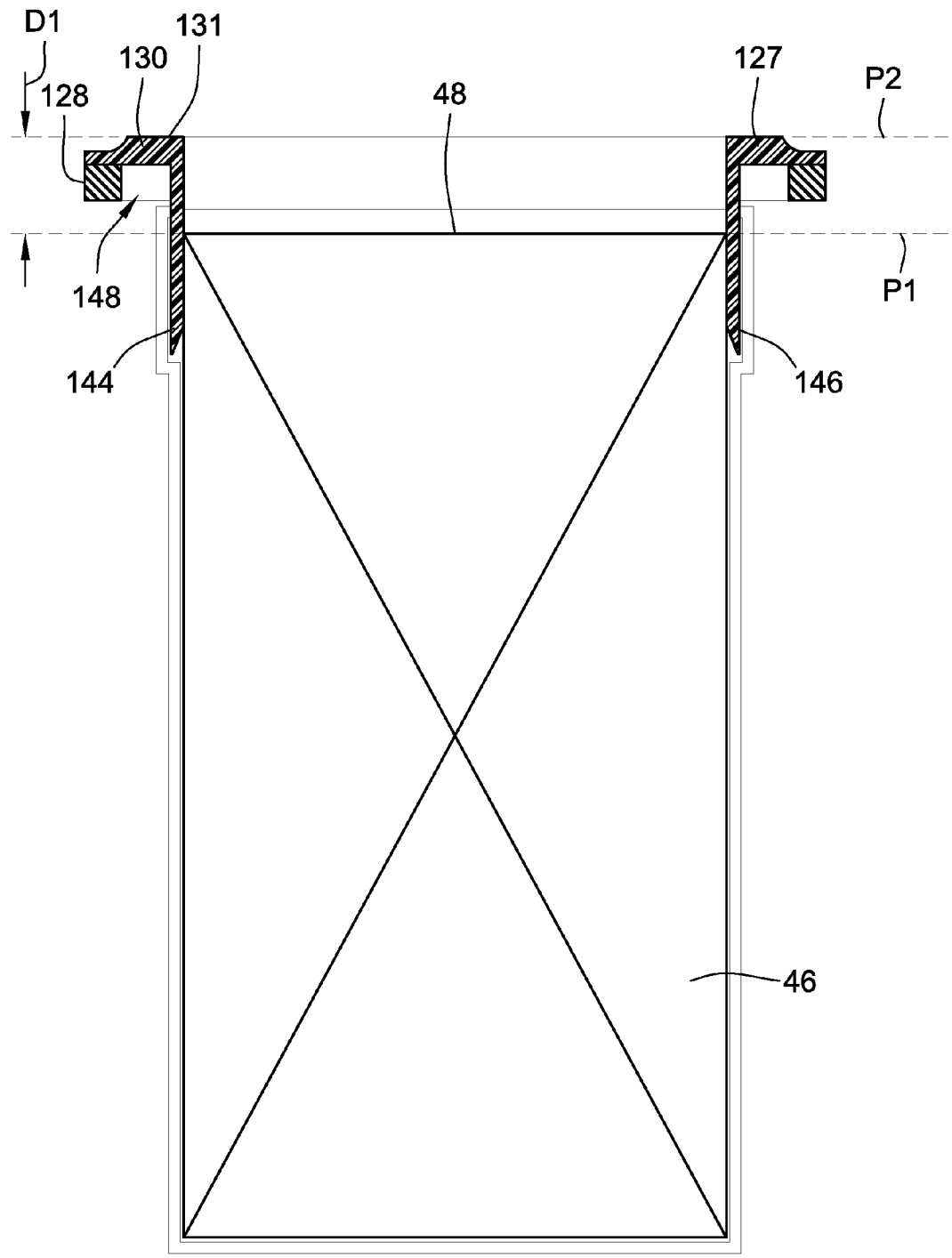
FIG. 10 is a cross-sectional view taken along the line 10-10 in FIG. 3.

FIG. 10 illustrates a cross-sectional view of an embodiment of filter cartridge 23 taken along the line 10-10 in FIG. 3. The inlet flow face 48 of the stack of filter media 46 extends generally along a first plane P1. The top surface 131 of the top portion 130 of the end frame 127 extends generally along a second plane P2. The first plane P1 of the media pack is located a distance D1 below the second plane P2 of the frame, e.g., the inlet flow face 48 of the stack of filter media 46 is located below, e.g., recessed from, the top surface 131 of the top portion 130 of the end frame 127.

With reference to FIG. 11, the seal 128 extends around the lower surface of the top portion 130 of the end frame 127 and is spaced radially outward from the perimeter of the media pack. The seal 128 may be a non-urethane seal, a synthetic rubber seal, an ethylene propylene diene monomer seal, or a nitrile seal. Other suitable seal materials may be used. The seal 128 is coupled to the lower surface of the top portion 130 of the end frame 127 and is configured to prevent passage of fluid bypassing the filter cartridge 23 between the housing 22 and the top portion 130 when the filter cartridge 23 is installed in the housing 22. If the seal is preformed, the seal 128 may be coupled to the top portion 130 by suitable adhesive or can alternatively be mechanically attached in a groove or snap-on arrangement. In other embodiments, the seal 128 may be coupled to the top portion 130 by any other suitable mechanism.

With reference to FIG. 4, the filter cartridge 23 includes a first end wall 160 and a second end wall 162 which may be preformed plastic panels like end caps, each wall 160 and 162 being identical to the other. The first end wall 160 is configured to be coupled to the first end 52 of the stack of filter media 46. The second end wall 162 is configured to be coupled to the second end 54 of the stack of filter media 46. In one embodiment, the end walls 160 and 162 are coupled to the stack of filter media 46 with a sealant and/or adhesive, such as rigid urethane, hot melt adhesive, epoxy, or plastisol, or the like.

Figure 12:
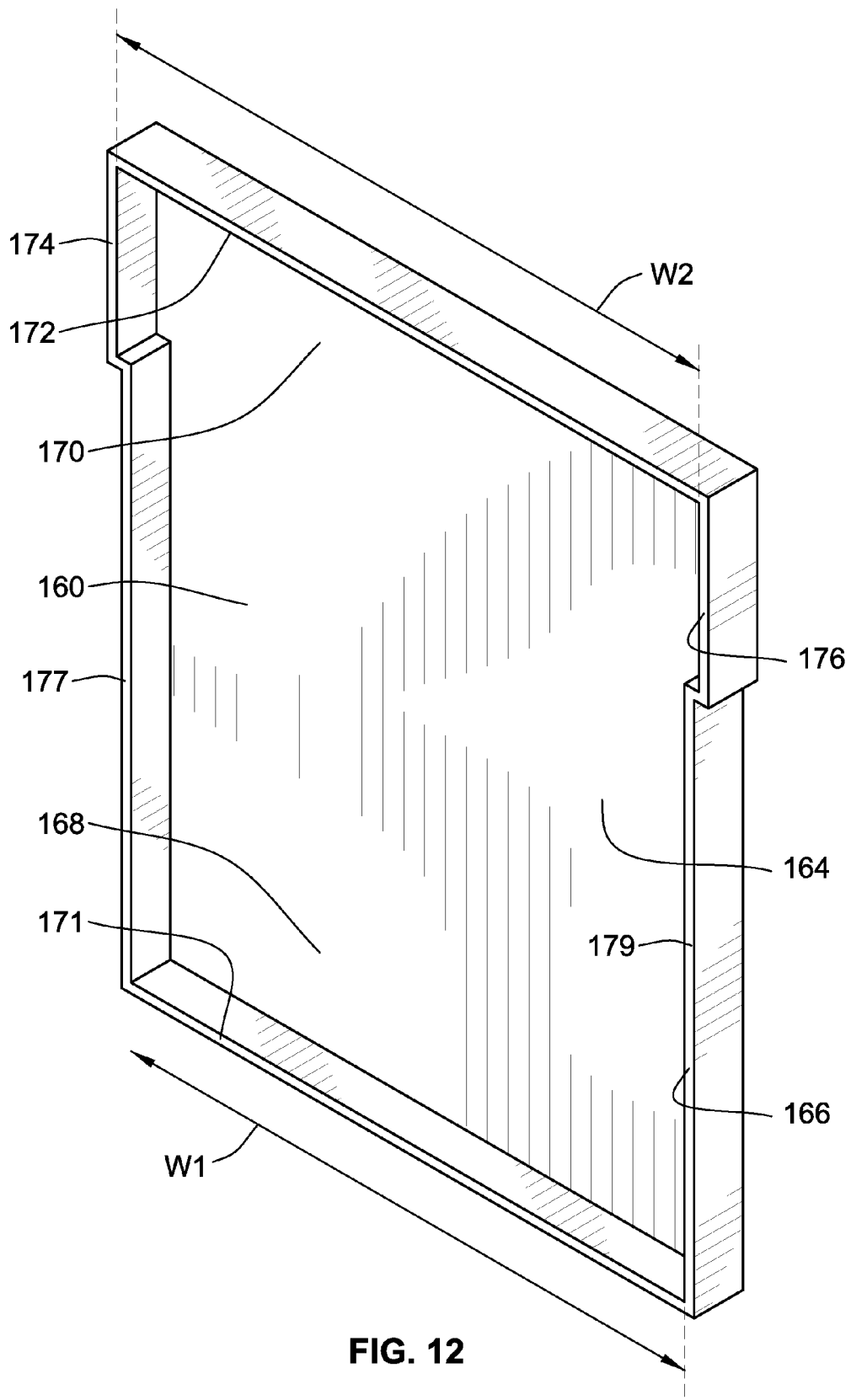
FIG. 12 is a perspective view of an embodiment of an end wall.

With reference to FIG. 12, each end wall 160 and 162 is generally cup shaped to provide an end cap structure. End walls 160 and 162 include a central portion 164 and an outer wall portion 166 extending generally perpendicularly to central portion 164 around the perimeter of the central portion 164. The central portion 164 includes a first lower portion 168 extending a width W1 and a second upper portion 170 extending a width W2. In one embodiment, the width W2 is greater than the width W1. The increased width proximate the inlet face facilitates interfitting relation with the end frame 127. Upper portion 170 extends above the inlet flow face to receive and cap opposed ends of the end frame 127.

Figures 14, 29:
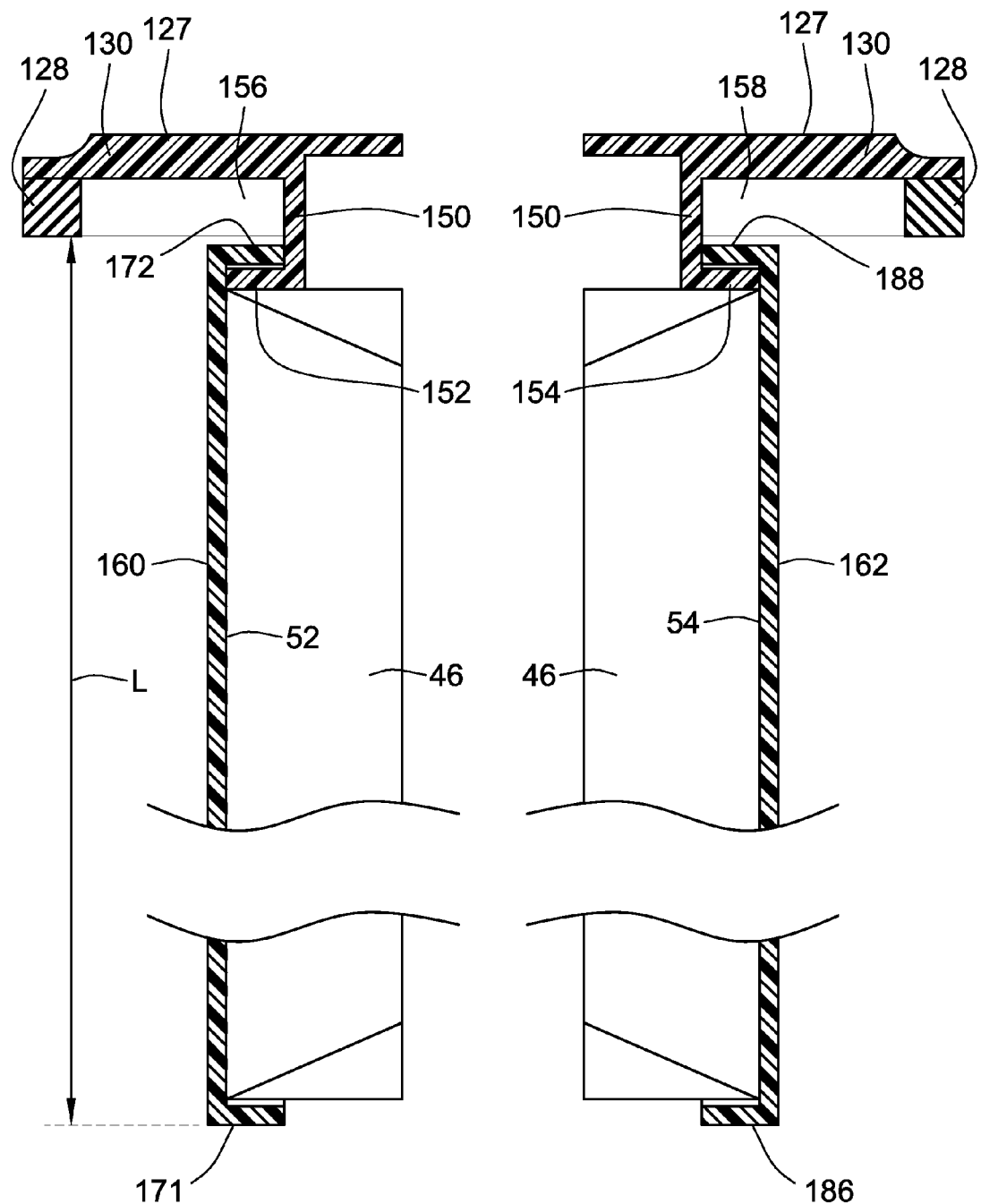
FIG. 14 is a cross-sectional view taken along the line 14-14 in FIG. 3.
FIG. 29 is a cross-sectional view taken along the line 29-29 in FIG. 3.
Figure 27:
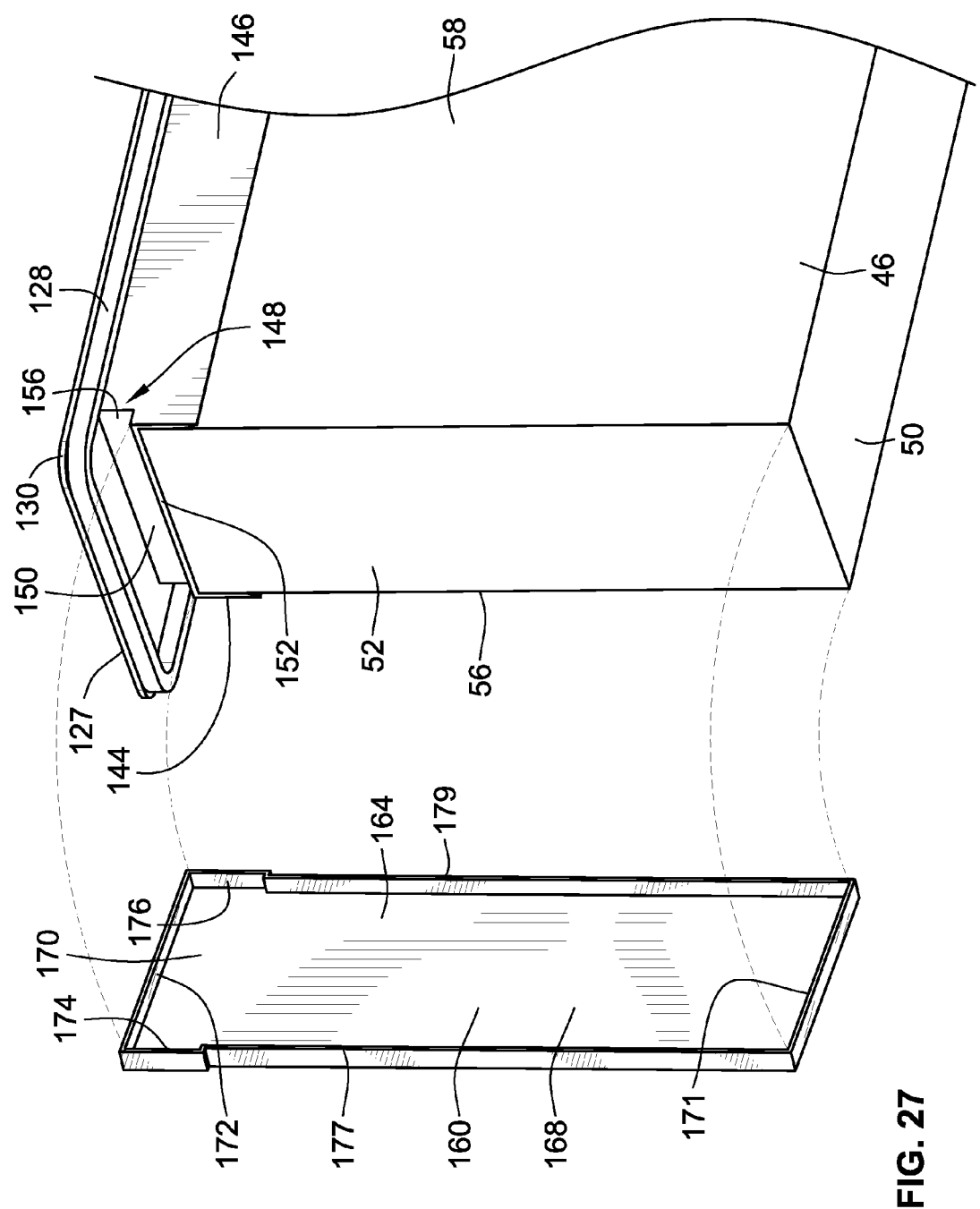
FIG. 27 is a view illustrating coupling of an embodiment of an end wall to an embodiment of an end frame and an embodiment of a stack of filter media.

With reference to FIGS. 12, 14 and 27, the central portion 164 of the first end wall 160 is configured to be located proximate the first end 52 of the stack of filter media 46. The lower portion 171 of the outer wall portion 166 is configured to be located under the outlet flow face 50 of the stack of media 46. The upper portion 172 of the outer wall portion 166 is configured to be located in the first channel 156 of the end frame 127 seated against the upper surface of the first horizontal wall portion 152. The first end wall 160 includes first and second vertical wall portions 174 and 176 of the outer wall portion 166 on opposite sides of the second upper portion 170. The inner surfaces of the first and second vertical wall portions 174 and 176 are configured to be located proximate the outer surfaces of the first and second legs 144 and 146 respectively when the first end wall 160 is coupled to the stack of filter media 46. The first end wall 160 also includes third and fourth vertical wall portion 177 and 179 of the outer wall portion 166 on opposite sides of the first lower portion 168. The inner surfaces of the third and fourth vertical wall portions 177 and 179 are configured to be located proximate the second sidewall 58 and first sidewall 56 of the filter media 46 respectively.

The first end wall 160 may also be coupled to the end frame 127 with adhesive and also seals to the frame to prevent fluid bypass at the interface. The outer wall portion 166 of the first end wall 160 is sized and configured to fit around the stack of filter media 46, the legs 144 and 146, and the first horizontal wall portion 152 of the end frame 127, thereby capping and sealing ends of the media pack and frame to prevent fluid bypass when assembled with sealant adhesive.

With reference to FIGS. 14 and 27, when the upper portion 172 of the outer wall portion 166 is located in the first channel 156 of the end frame 127, the outer wall portion 166 overlaps with the first leg 144 in a direction along the first sidewall 56 of the stack of filter media 46. Additionally, when the upper portion 172 of the outer wall portion 166 is located in the first channel 156 of the end frame 127, the outer wall portion 166 overlaps with the second leg 146 in a direction along the second sidewall 58 of the stack of filter media 46. Additionally, when the upper portion 172 of the outer wall portion 166 is located in the first channel 156 of the end frame 127, the central portion 164 of the end wall 160 overlaps with both the first leg 144 and the second leg 146 in a direction along the first end 52 of the stack of filter media 46. When the upper portion 172 of the outer wall portion 166 is located in the first channel 156 of the end frame 127, the upper portion 172 overlaps with the first horizontal wall portion 152 in a direction along the inlet flow face 48 of the filter media 46.

Figure 13:
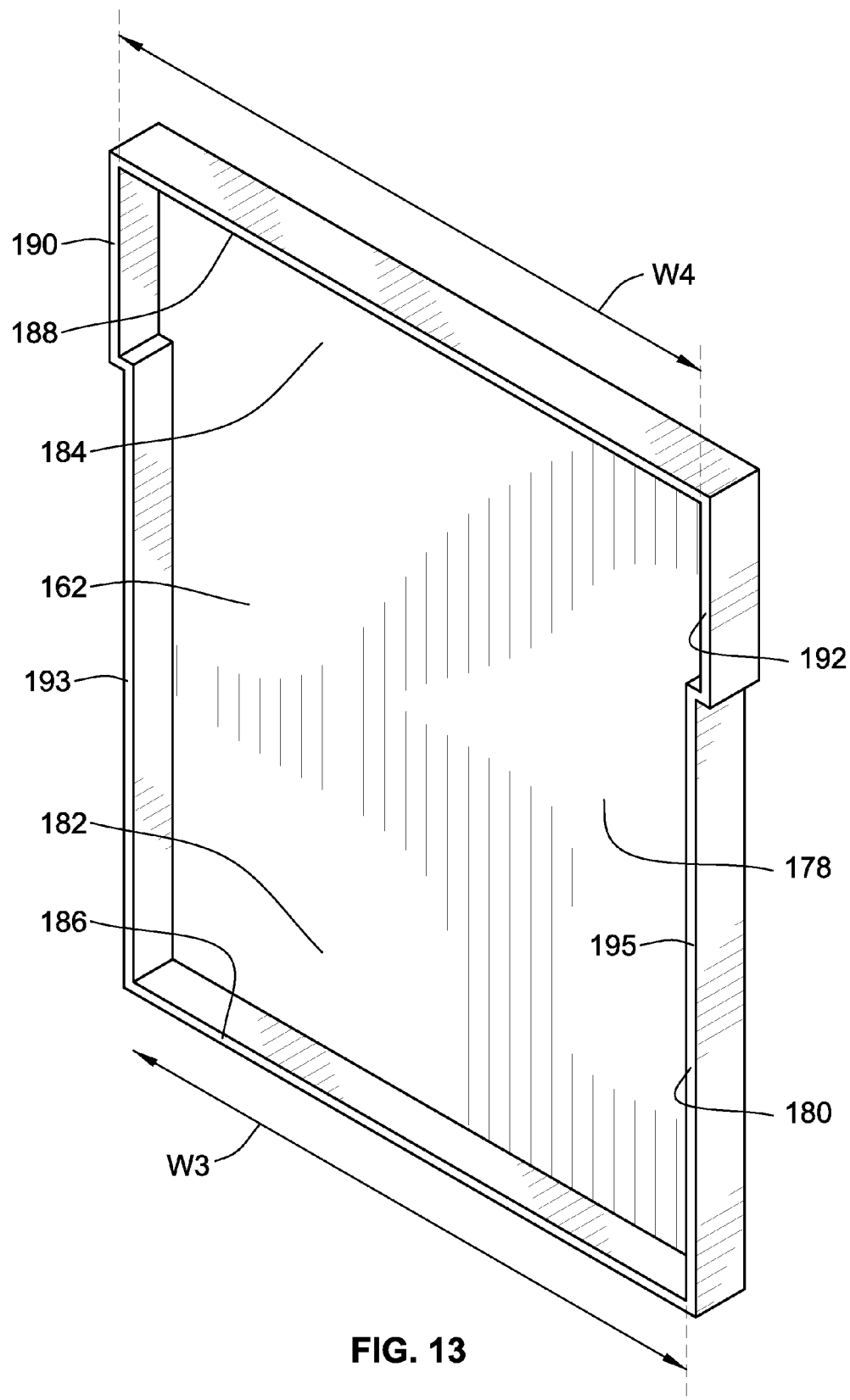
FIG. 13 is a perspective view of an embodiment of an end wall.

With reference to FIG. 13, the second end wall 162 is identical to first end wall in structure and function but will be described below. End wall 162 includes a central portion 178 and an outer wall portion 180 extending generally perpendicularly to the central portion 178 around the perimeter of the central portion 178. The central portion 178 includes a first lower portion 182 extending a width W3 and a second upper portion 184 extending a width W4. In one embodiment, the width W3 is generally the same as the width W1 (see FIG. 12). In one embodiment, the width W4 is generally the same as the width W2 (see FIG. 12). In one embodiment, the width W4 is greater than the width W3.

Figure 28:
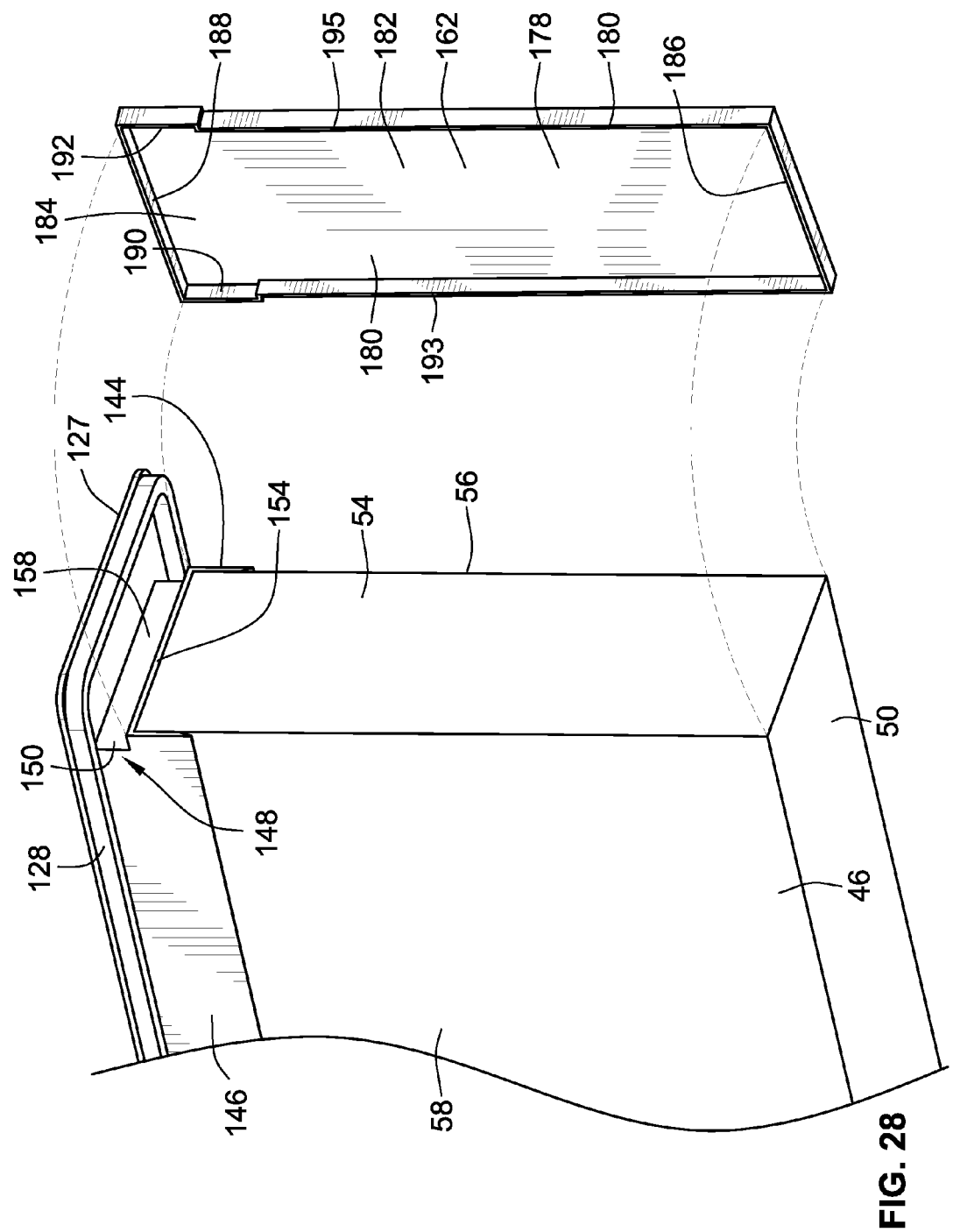
FIG. 28 is a view illustrating coupling of an embodiment of an end wall to an embodiment of an end frame and an embodiment of a stack of filter media.

With reference to FIGS. 13, 28 and 29 in one embodiment, the central portion 178 of the second end wall 162 is configured to be located proximate the second end 54 of the stack of media 46. The lower portion 186 of the outer wall portion 180 is configured to be located under the outlet flow face 50 of the stack of media 46. The upper portion 188 of the outer wall portion 180 is configured to be located in the second channel 158 of the end frame 127 seated against the upper surface of the second horizontal wall portion 154. The second end wall 162 includes first and second vertical wall portions 190 and 192 of the outer wall portion 180 on opposite sides of the second upper portion 184. The inner surfaces of the first and second vertical wall portions 190 and 192 are configured to be located proximate the outer surfaces of the first and second legs 144 and 146 respectively when the second end wall 162 is coupled to the stack of filter media 46. The second end wall 162 also includes third and fourth vertical wall portion 193 and 195 of the outer wall portion 180 on opposite sides of the first lower portion 182. The inner surfaces of the third and fourth vertical wall portions 193 and 195 are configured to be located proximate the first sidewall 56 and second sidewall 58 of the filter media 46 respectively.

Like the first end wall 160, the second end wall 162 is also coupled to the stack of filter media 46 with adhesive, and coupled to the end frame 127 with adhesive and with a seal formed therebetween. In other embodiments, the second end wall 162 may be coupled to the stack of filter media 46 and/or the end frame 127 by any other suitable mechanism. In one embodiment, the outer wall portion 180 of the second end wall 162 is sized and configured to fit around the stack of filter media 46, the legs 144 and 146, and the second horizontal wall portion 154 of the end frame 127.

With reference to FIGS. 28 and 29, when the upper portion 188 of the outer wall portion 180 is located in the second channel 158 of the end frame 127, the outer wall portion 180 overlaps with the first leg 144 in a direction along the first sidewall 56 of the stack of filter media 46. Additionally, when the upper portion 188 of the outer wall portion 180 is located in the second channel 158 of the end frame 127, the outer wall portion 180 overlaps with the second leg 146 in a direction along the second sidewall 58 of the stack of filter media 46. Additionally, when the upper portion 188 of the outer wall portion 180 is located in the second channel 158 of the end frame 127, the central portion 178 of the end wall 162 overlaps with both the first leg 144 and the second leg 146 in a direction along the second end 54 of the stack of filter media 46. When the upper portion 188 of the outer wall portion 180 is located in the second channel 158 of the end frame 127, the upper portion 188 overlaps with the second horizontal wall portion 154 in a direction along the inlet flow face 48 of the filter media 46.

Figure 15:
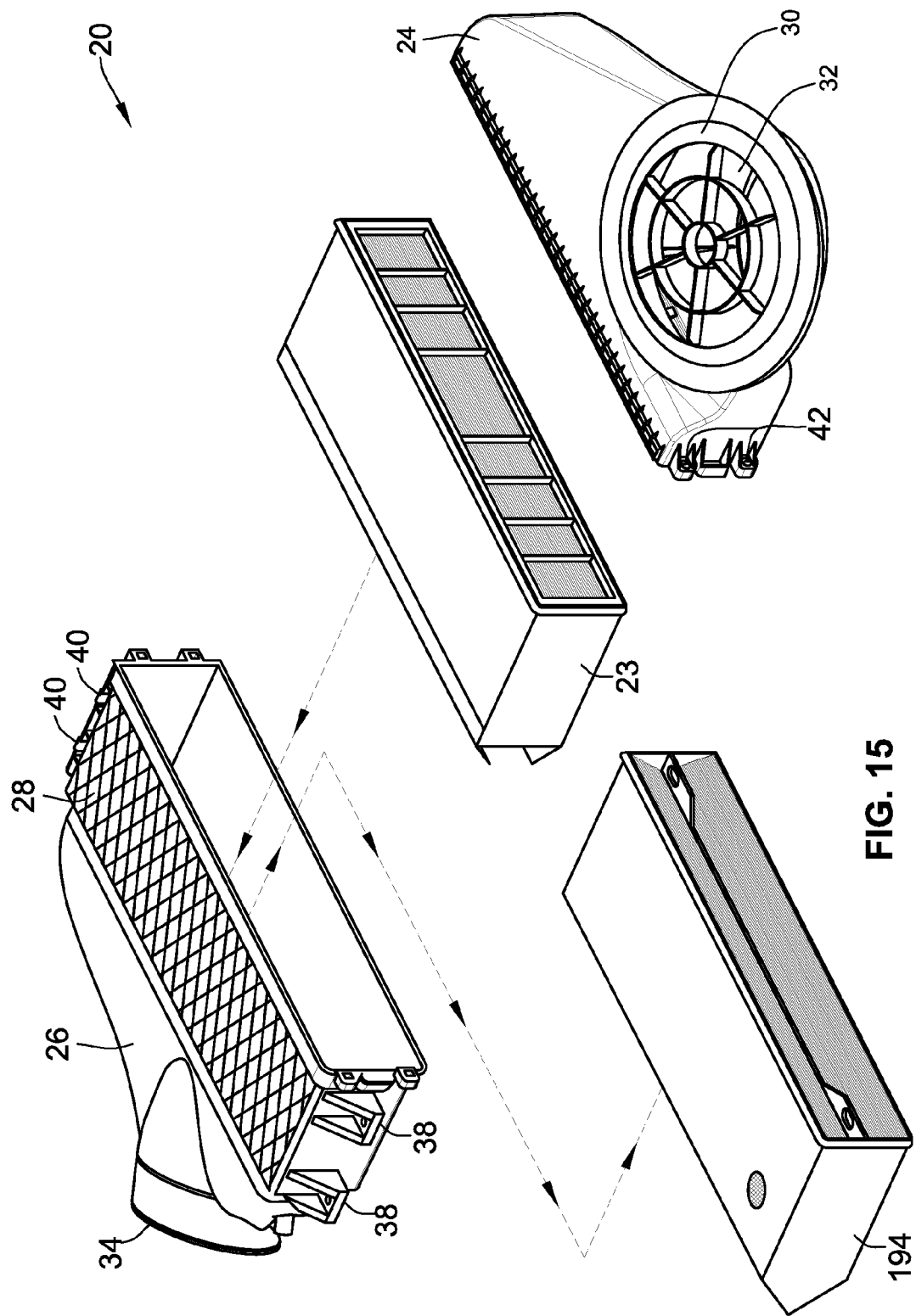
FIG. 15 is a perspective view of two embodiments of filter cartridges illustrating removal of a first filter cartridge from an embodiment of a housing and inserting the embodiment of a second filter cartridge into the embodiment of the housing.

With reference to FIG. 15, the housing 26 may have a prior art filter cartridge 194 installed therein. Prior art filter cartridge 194 includes two stacks of media that together forming a non-planar V-shaped inlet face. The prior art filter cartridge 194 also has a V-shaped outlet face that is non-planar and projects to an apex. As illustrated in FIG. 15, the prior art filter cartridge 194 may be removed from the housing 22, e.g., when the filter cartridge 194 is spent, etc., and the new filter cartridge 23 according to embodiments of the present invention may be inserted into the housing 22.

Figure 16:
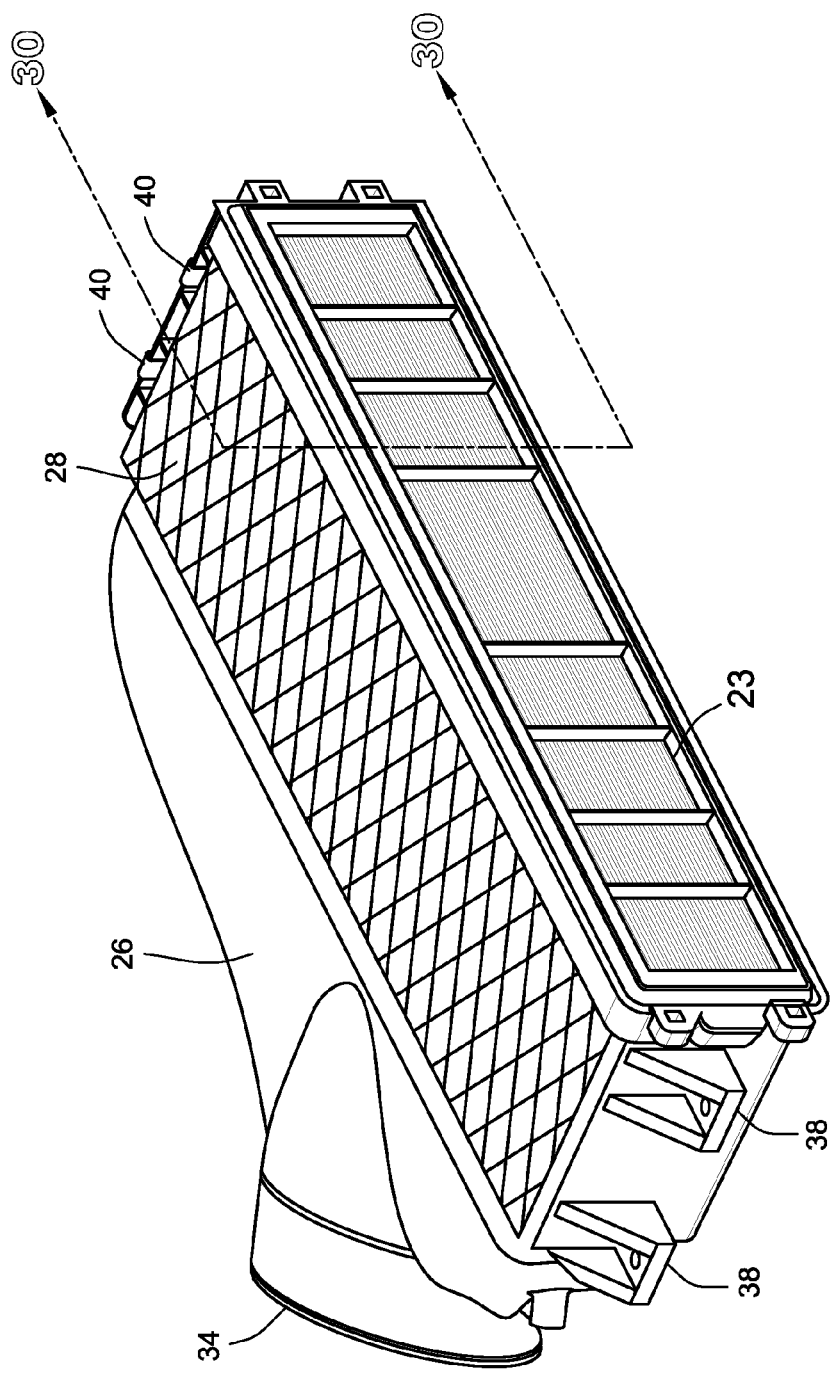
FIG. 16 is a perspective view of the embodiment of the second filter cartridge illustrated in FIG. 15 in an embodiment of a housing.
Figure 30:
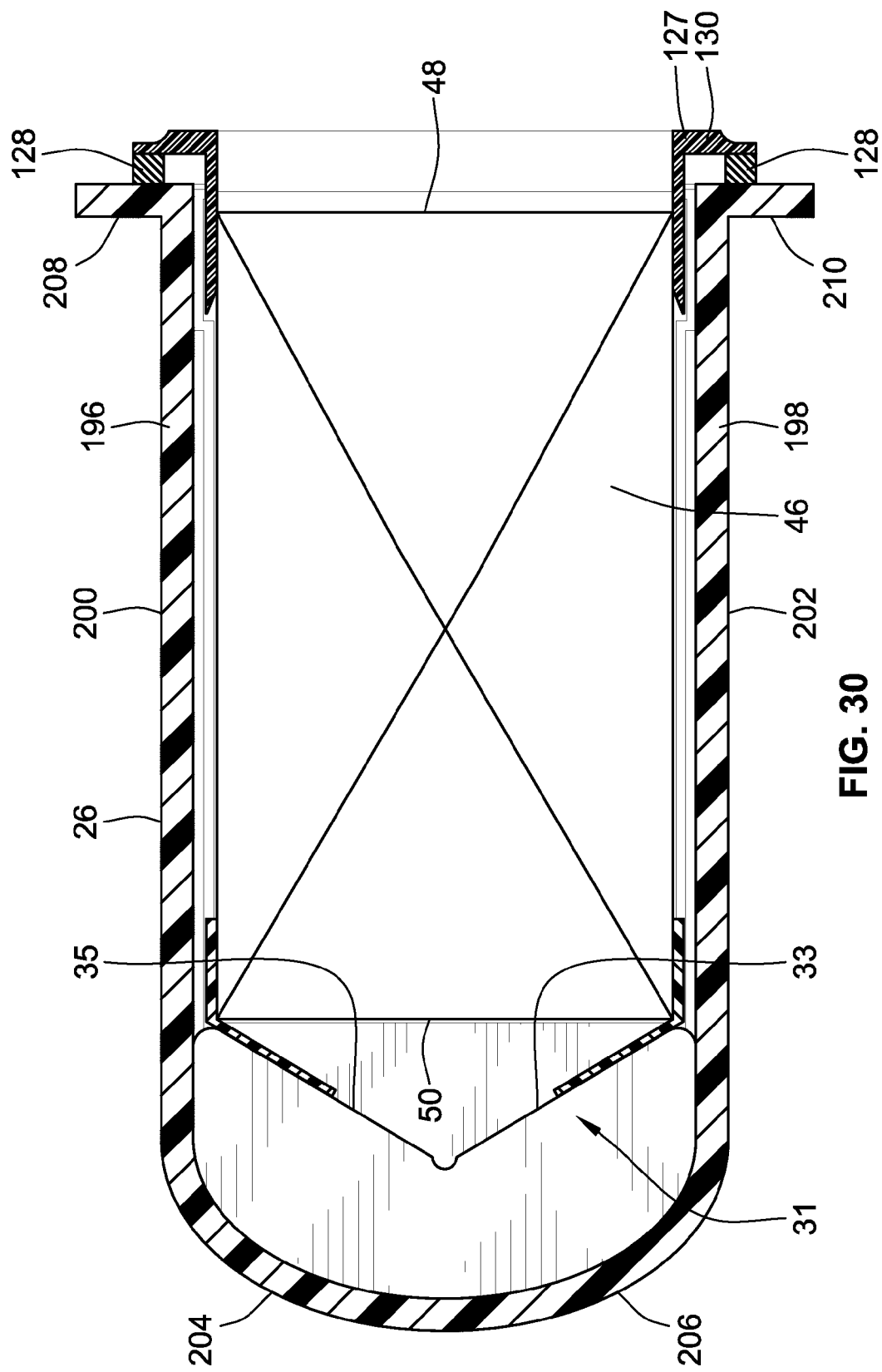
FIG. 30 is a cross-sectional view taken along the line 30-30 in FIG. 16.

With reference to FIGS. 16 and 30, the filter cartridge 23 of embodiments of the present invention is located inside the outlet portion 26 of the housing 22, with the inlet portion 24 of the housing 22 removed. As illustrated in FIGS. 16 and 30, in one embodiment, the seal 128 is located between the top portion 130 of the end frame 127 and the sealing portions 208 and 210. The seal 128 is configured to seal with the sealing portions 208 and 210 to prevent fluid flow from bypassing filtering through the filter media 46 of the filter cartridge 23. The outlet flow face 50 of the filter cartridge 23 is located between the first portion 200 of the sidewall 196 and the first portion 202 of the second sidewall 198.

With further reference to FIG. 30, in one embodiment, the outlet flow face 50 of the filter cartridge 23 is generally planar, e.g., does not match the first support feature 33 or the second support feature 35.

Figure 17:
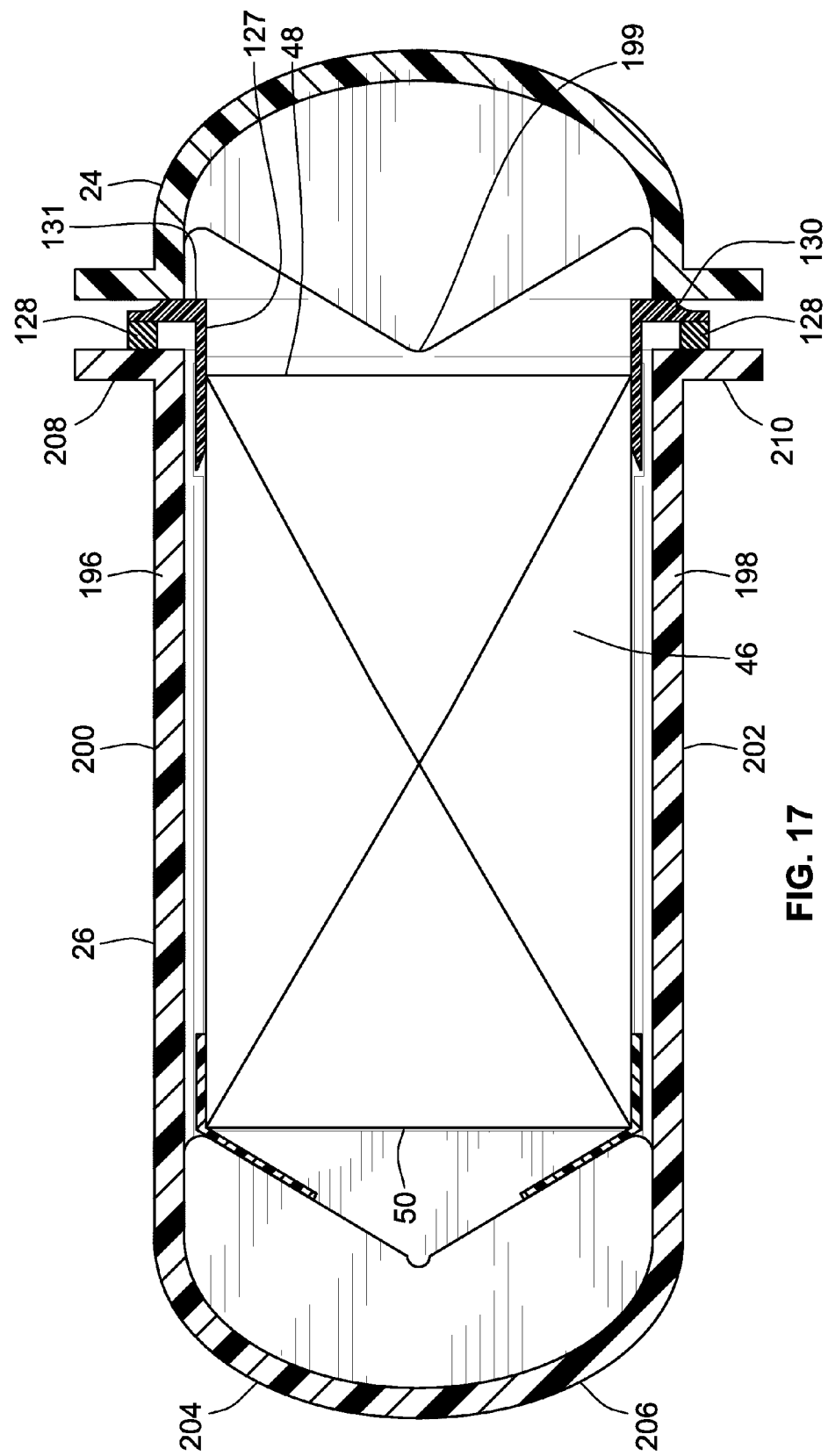
FIG. 17 is a cross-sectional view taken along the line 17-17 in FIG. 1.

FIG. 17 illustrates a cross-sectional view of the filter cartridge 23 in the housing 22 taken along the line 17-17 in FIG. 1. The inlet portion 24 includes a projecting portion, illustrated in FIG. 17 as an angular locating projection 199. The angular locating projection 199 is shaped to match the angled inlet flow face 197 of the filter cartridge 194. However, as is illustrated in FIG. 18, the flat inlet flow face 48 of the stack of filter media 46 is located below the top surface 131 of the top portion 130 of the end frame 127, the filter cartridge 23 is configured to accommodate the angular locating projection 199, e.g., with the planar inlet flow face 48, not requiring the angled, non-planar inlet flow face 197 of the filter cartridge 194.

With reference to FIG. 18, another embodiment of a filter cartridge 301 is illustrated. Various features of the filter cartridge 301 are similar to the filter cartridge 23 described above. Therefore, the description of the filter cartridge 301 will focus on differences from the filter cartridge 23. The filter cartridge 301 includes a prefilter, illustrated in FIG. 18 as a foam pad prefilter 302. The prefilter 302 is located upstream of the inlet flow face 348 of the filter media 346. In one embodiment, the prefilter 302 includes generally open material having filter density of between approximately 75 pores per inch (PPI) and approximately 90 PPI. In another embodiment, the pore size of the prefilter 302 is approximately 50 micron (μm). The prefilter 302 is configured to trap larger particle (e.g., particles greater than 50 μm, etc.) to prevent clogging of the fluted filter media 346. Additionally, the prefilter 302 is configured to minimize pressure drop thereacross. In one embodiment, the pressure drop across the prefilter 302 is between approximately 0.5 in. H20 and approximately 2 in. H20. In one embodiment, the prefilter 302 is formed from reticulated foam-polyester. In another embodiment, the prefilter 302 is formed from non-woven polyester. In other embodiments, other suitable materials may be used.

With reference to FIGS. 18 and 19, the prefilter 302 is located between the inlet flow face 348 of the filter media 346 and the ribs 342 of the end frame 327. Thus, the prefilter 302 is recessed below the top surface 331 of the end frame 327, and, therefore, as in the previous embodiment (see FIG. 17), the filter cartridge 301 may accommodate the angular locating projection 199 of the filter cartridge, e.g., the angular locating projection may project downwardly past the top surface 331 of the end frame 327 between the ribs 342, without, e.g., damaging, deforming, etc., the prefilter 302 or the filter media 348. The prefilter 302 extends from one side of the vertical wall portion 350 of the end frame 327 to the other side of the vertical wall portion 350, therefore, fluid to be filtered passes through the prefilter 302 before passing through the filter media 346, e.g., fluid to be filtered is prevented from bypassing the prefilter 302 to pass through the filter media 346 without passing through the prefilter.

In one embodiment, the prefilter 302 is held in place by the ribs 342 of the end frame 327 and by the inlet flow face 348 of the filter media 346, e.g., is not coupled to the end frame 327 or the filter media 346. In another embodiment, the prefilter 302 is coupled to the filter media 346 (e.g., by fasteners, adhesive, etc.). In another embodiment, the prefilter 302 is coupled to the end frame 327 (e.g., by fasteners, adhesive, etc.). In another embodiment, the prefilter 302 is coupled to both the end frame 327 and the filter media 346.

Figure 31:
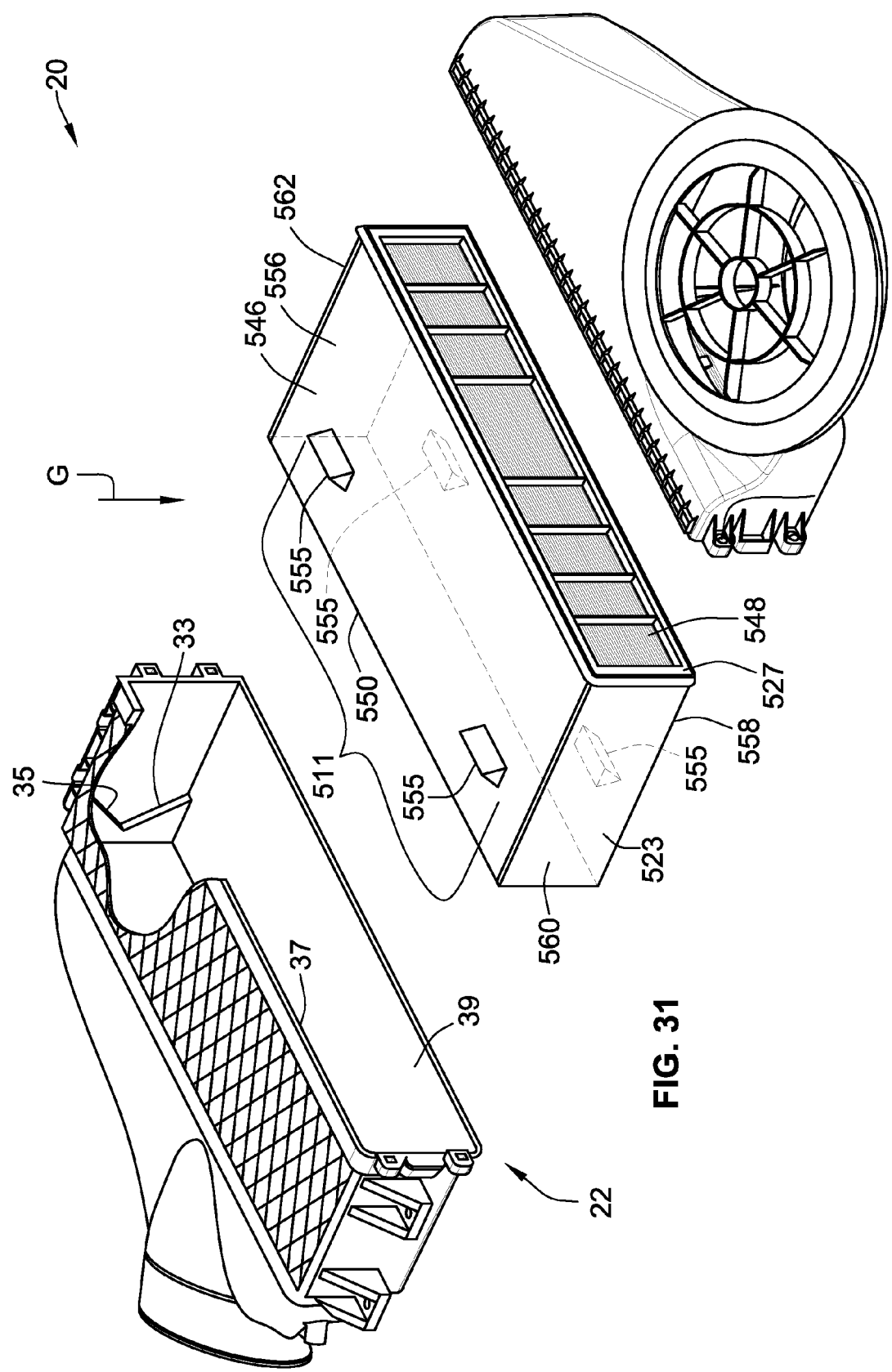
FIG. 31 is a perspective view of an alternative embodiment of a filter assembly in an exploded configuration.

With reference to FIG. 31, an alternative filter cartridge 523 is illustrated. Because the filter cartridge 523 is inserted into the housing 22 in a horizontal orientation, the filter cartridge 523 is mounted in a cantilevered state. To reduce or eliminate the torques imparted on the frame 527 of the filter cartridge 523, a support arrangement 511 is added proximate the outlet end 550 of the block of filter media 546 and spaced away from frame 527 proximate the inlet end 548 of the block of filter media 546.

The support arrangement 511 extends between the block of filter media 546 and the body section of housing 22 to support the cantilevered end, i.e. outlet end 550 of the filter cartridge 523. The support arrangement 511 preferably contacts, at least, the inner surfaces of the top and bottom walls 37, 39 of the filter housing 22.

In FIG. 31, the support arrangement 511 is provided by a plurality of standoffs 555 attached to first and second sidewalls 556, 558 of the filter cartridge 523. The standoffs 555 preferably have canted faces that face the inlet and outlet ends 548, 550 of the filter cartridge 523. The canted faces help facilitate insertion and removal of the filter cartridge 523 from the filter housing 22.

In the illustrate embodiment, there are four standoffs 555, two on the first sidewall 556 and two on the second sidewall 558. However, more or less standoffs 555 are possible. For example, a single standoff 555 could be attached to the sidewalls 556, 558. Further, it may be only required to have standoffs 555 on the second sidewall 558, which would be the vertically bottom sidewall of the filter cartridge 523 when assembled so as to support the cantilevered outlet end 550 of the filter cartridge 523 due to the force of gravity G. Additionally, the standoffs 555 could have different dimensions. For instance, a single standoff could be provided that extends the entire width of the filter cartridge 523 as the two illustrated standoffs 555 on a single side.

The standoffs 555 could be preformed and then attached to the rest of the filter cartridge, e.g. the filter media 546, using an adhesive or could be molded directly thereto. The standoffs 55 could be rigid such as from a hard plastic or formed from a softer more compliant material such as a foamed urethane. Further, the standoffs 555 could be attached to end walls 560, 562. By being attached, they could be separately formed from end walls 560, 562 or molded with the end walls 560, 562 as a single component.

The standoffs 555 could take other shapes such as domed structures. Further, the standoffs 555 could extend outward in a horizontal direction from the sidewalls 560, 562 to contact the sides of the housing 22 to further improve the location of the free end of the filter cartridge 523.

The inclusion of the support arrangement 511 helps further combat vibrational forces that may act on the filter cartridge 523.

Figure 32:
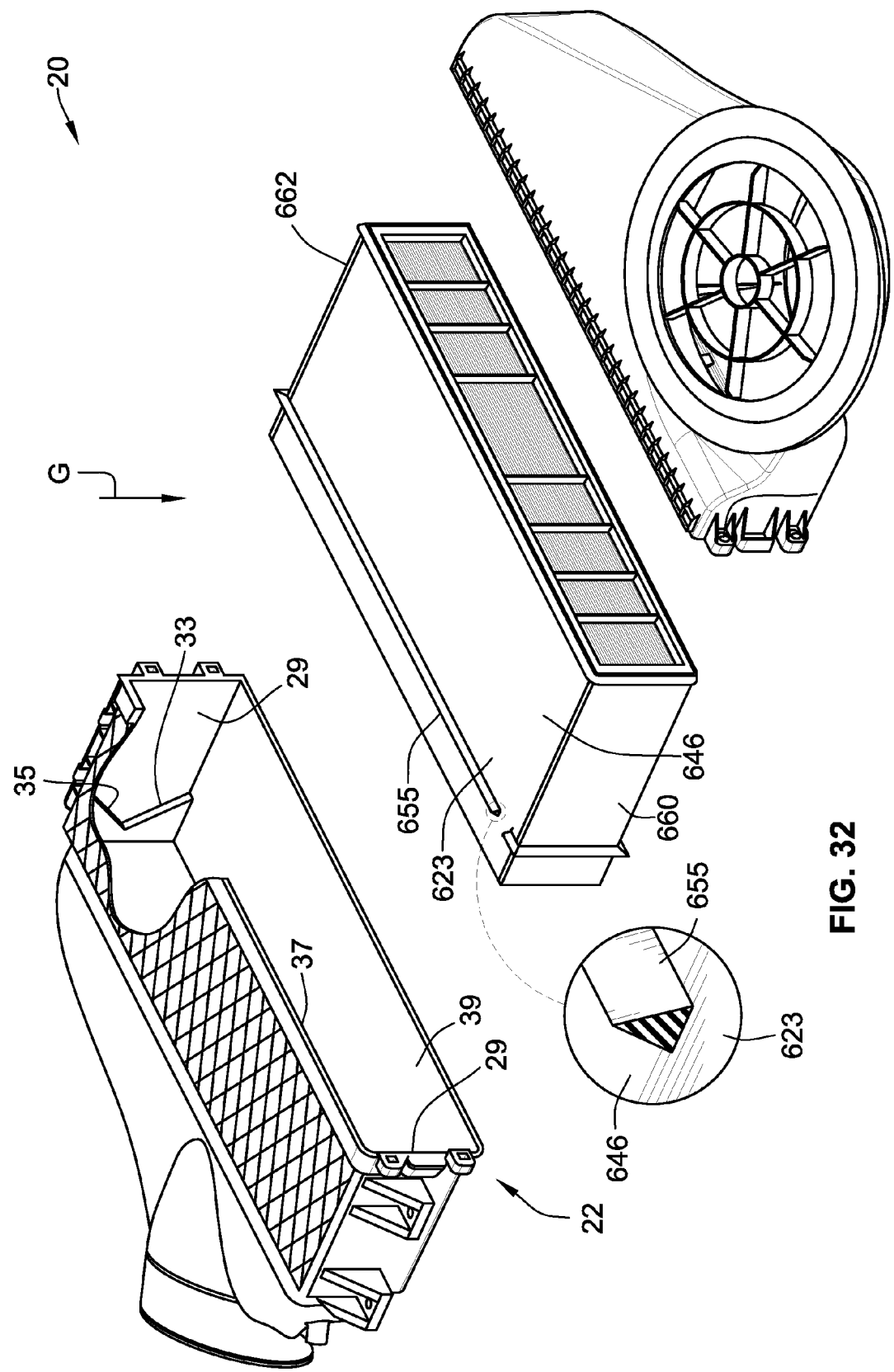
FIG. 32 is a perspective view of an alternative embodiment of a filter assembly in an exploded configuration.

FIG. 32 illustrates a further embodiment of a support arrangement illustrated in as a continuous band 655 that circumscribes the rest of the filter cartridge 623, i.e. the block of filter media 646 and end walls 660, 662. The band 655 would contact all of the sides of the housing 22.

Preferably, the band is formed from a permeable material so as to prevent forming a seal between the filter housing 22 and filter cartridge 623. The band may include air flow apertures formed axially therethrough specifically to prevent any such sealing function.

Again, the band may be formed from a more rigid material such as a hard plastic or a softer more compliant material such as a foamed urethane.

Figure 33:
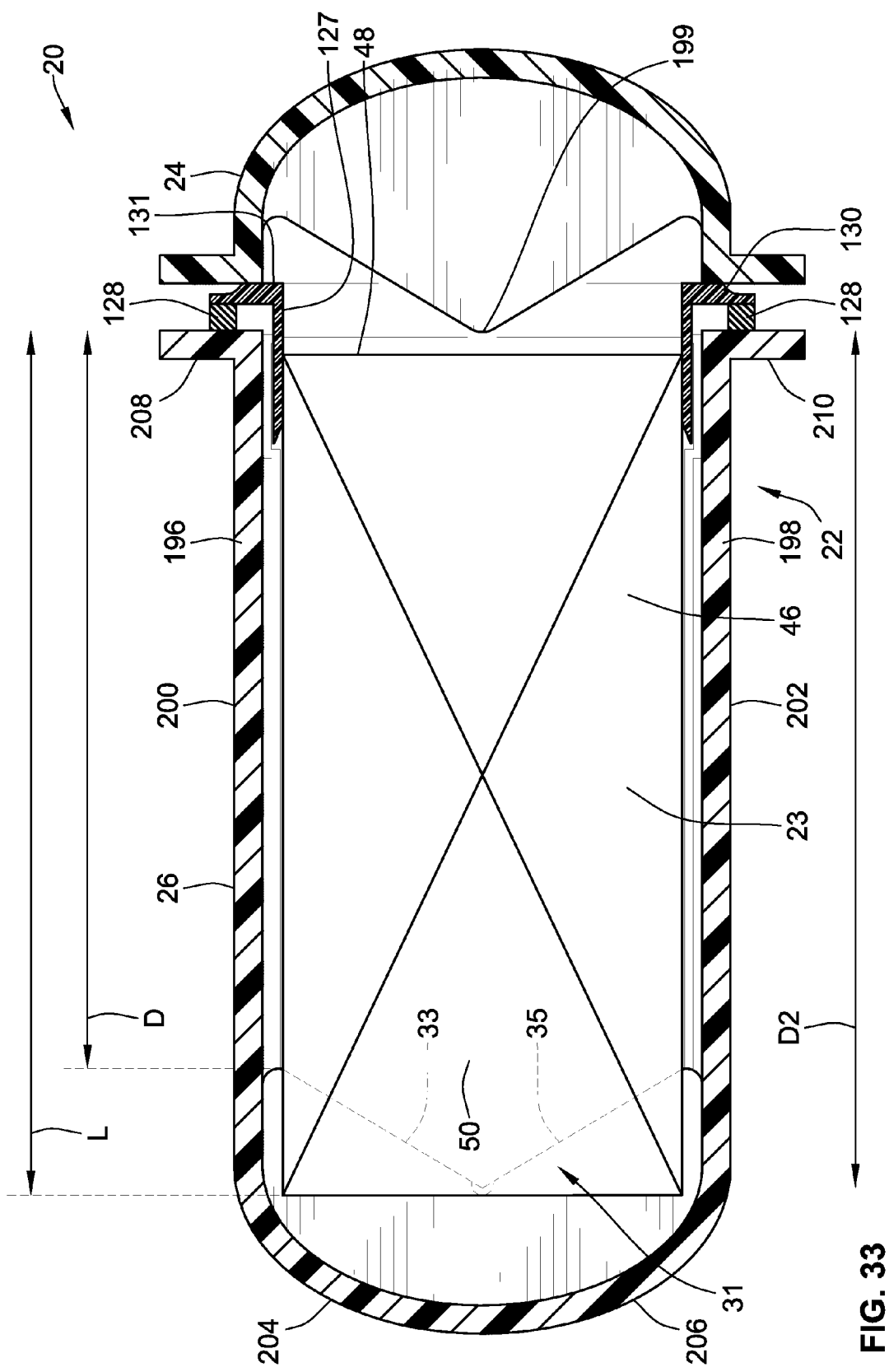
FIG. 33 is an alternative cross-sectional illustration similar to FIG. 17 showing an alternative filter cartridge having an increased length and reduced width.

With reference to FIGS. 3 and 33, in some embodiments, the width W of the filter cartridge 23 is less than a width between the opposed angular support features 31 of the filter housing 22 and the length L of the filter cartridge 23 from seal 128 to the opposite free end of the filter cartridge is greater than the depth D of the filter housing from the inlet opening to the angular support features 31. This arrangement allows for the filter cartridge 23 to bypass the angular support features 31 such that the filter cartridge can extend deeper into the filter housing 22 when installed. This allows for additional length of the filter cartridge 23 and to increase the amount of filter media that can be provided.

Further, in some embodiments, the length L of the filter cartridge 23 from seal 128 to the opposite free end is greater than the depth D2 of the filter housing 22 such that the outlet end 50 of the filter cartridge 23 is inserted axially past the apex or junction of support sidewalls 33, 35 of the angular support features 31. In some embodiments, a method of replacing a filter cartridge, such as cartridge 194, that cooperates with the angular support feature 31 with a filter cartridge that does not cooperate with the angular support feature 31 is provided. More particularly, the method would include inserting a filter cartridge, such as version of filter cartridge 23, where the length L is greater than distance D and more preferably greater than distance D2 such that the outlet end of the filter cartridge is inserted past, at least a portion, of the angular support feature 31.

These embodiments that do not cooperate with support features 31 will typically include the support arrangements for supporting the cantilevered free end of the filter cartridge 23, such as standoffs 555 and band 655 discussed above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly comprising:
   a filter housing defining an internal cavity, an inlet, and an outlet;
   a filter cartridge including a stack of filter media including an inlet flow face and an outlet flow face, the filter cartridge also including a frame coupled to the filter media;
   wherein at least a portion of the filter cartridge is located within the internal cavity of the filter housing;
   wherein the frame member defines an opening through which fluid may be directed to the inlet flow face of the filter media, the frame member including a top surface;
   wherein the inlet flow face is recessed below the top surface of the frame member;
   wherein a projecting portion of the housing projects into the opening defined by the frame member; and
   wherein the frame member surrounds the projecting portion of the housing and provides clearance due to the inlet flow face being recessed below the top surface of the frame member.

2. The filter assembly of claim 1, wherein the frame includes a first leg and a second leg, the first and second legs located on opposite sides of the opening; and
   wherein the filter cartridge is located between the first leg and the second leg.

3. A filter assembly comprising:
   a filter housing defining an internal cavity, an inlet, and an outlet;
   a filter cartridge including a stack of filter media including an inlet flow face and an outlet flow face, the filter cartridge also including a frame coupled to the filter media;
   wherein at least a portion of the filter cartridge is located within the internal cavity of the filter housing;
   wherein the frame member defines an opening through which fluid may be directed to the inlet flow face of the filter media, the frame member including a top surface;
   wherein the inlet flow face is recessed below the top surface of the frame member;
   wherein the frame includes a rectangular top portion extending around the opening and defining a larger perimeter than the stack, the filter assembly also including a sealing member coupled to the top portion outside the legs extending around the opening, the sealing member configured to seal with the filter housing to prevent fluid flow from bypassing the filter cartridge when the filter cartridge is installed in the filter housing, the sealing member being spaced above the inlet flow face.

4. The filter assembly of claim 1, wherein the filter cartridge includes a first end cap sealing one side of the filter media and overlapping with the frame member; and
   wherein the filter cartridge includes a second end cap sealing another side opposite the one side of the filter media, the second end cap overlapping with the frame member.

5. The filter assembly of claim 1, wherein the frame includes a plurality of ribs extending across the opening and below the top surface of the frame, the ribs running across and over the inlet flow face of the filter cartridge; and
   wherein the ribs are recessed from the top surface of the frame member.

6. The filter assembly of claim 1, wherein the filter housing includes a first wall and a second wall; and
  wherein the first wall includes a first portion and a second portion;
  wherein the second wall includes a first portion and a second portion;
  wherein the first portion of the first wall and the first portion of the second wall are generally parallel;
  wherein the second portion of the first wall and the second portion of the second wall converge towards one another proximate the outlet; and
  wherein the outlet flow face is flat, the filter cartridge having a guide mechanism projecting from the outlet flow face to engage the first and second portions.

7. The filter assembly of claim 6, wherein the outlet flow face of the filter media is located between the first portion of the first wall and the first portion of the second wall when the filter cartridge is installed in the filter housing; and
  wherein the guide mechanism includes converging blades projecting from opposing sides of the stack and into a region between second portions;
  wherein the converting blades of the guide mechanism are axially offset from the outlet flow face in the direction of fluid flow through the filter media.

8. The filter assembly of claim 1, wherein the stack of filter media includes a first side and a second side opposite the first side, the first and second sides extending generally perpendicular to the inlet and outlet flow faces and generally parallel to one another, wherein the frame member defines a first channel proximate the first side and a second channel proximate the second side, the filter cartridge further including a first end wall extending generally over the first side of the filter media, the first end wall including a central portion and an outer wall portion extending generally perpendicularly to the central portion, the outer wall portion including an upper portion configured to be located in the first channel of the frame member; and
  the filter cartridge further including a second end wall extending generally over the second side of the filter media, the second end wall including a central portion and an outer wall portion extending generally perpendicularly to the central portion, the outer wall portion of the second end wall including an upper portion configured to be located in the second channel of the frame member.

9. A method of replacing a filter cartridge in a filter assembly, the filter assembly including a filter housing defining an internal cavity, an inlet, and an outlet, the filter housing including sidewalls proximate the outlet extending inwardly toward one another, the method comprising:
  providing a filter cartridge including a fluted filter media and a frame member, the fluted filter media having an inlet flow face and an outlet flow face, the flutes of the fluted filter media extending from the inlet flow face to the outlet flow face, the outlet flow face being generally planar, the frame member including a top portion having a top surface, the top portion extending from a first end to a second end and defining a central opening, the frame member being coupled to the fluted filter media such that fluid may be directed through the central opening to the inlet flow face of the filter media, the inlet flow face of the filter media being recessed below the top surface of the top portion;
  locating the filter cartridge in the internal cavity of the filter housing;
  inserting a projection portion of the housing into the central opening defined by the frame member, the frame member surrounding the projection portion of the housing and providing clearance due to the inlet flow face being recessed below the top surface of the frame member.

10. The method of claim 9, wherein the sidewalls of the filter housing include a first section where the sidewalls extend generally parallel to one another, and wherein the outlet flow face of the filter media is located between the first section of the sidewalls when the filter cartridge is located in the internal cavity of the filter housing.

11. The method of claim 9, further comprising removing a filter cartridge including removing a media pack arrangement with filter media having first and second opposite flow faces, the media pack arrangement having a first recessed central region in one of the flow faces prior to locating the filter cartridge in the internal cavity of the filter housing.

12. The method of claim 9, wherein the filter cartridge further includes a seal member coupled to the frame member and no portion of the seal member is positioned axially between the inlet flow face and the outlet flow face, wherein the step of locating the filter cartridge in the internal cavity of the filter housing includes locating the seal against the filter housing to prevent contaminated fluid from passing into the filter housing.

13. A filter cartridge comprising:
  filter media including a generally rectangular inlet flow face, an outlet flow face, and opposite first and second and opposite third and fourth sides extending from the inlet flow face to the outlet flow face;
  the first, second, third, and fourth sides each extending generally perpendicularly to the inlet flow face and the outlet flow face, the first side extending along a first plane, the second side extending along a second plane, the third side extending along a third plane, the fourth side extending along a fourth plane;
  a frame member coupled to the filter media, the frame member defining a generally rectangular opening through which fluid may pass to the inlet flow face, the frame member including a top portion and first and second legs spaced apart from one another;
  the first leg being coupled to the first side of the filter media, the second leg being coupled to the second side of the filter media;
  a first end cap sealing the third side of the filter media, the first end cap overlapping with the first leg and the second leg in at least one direction parallel to either the first, third, or fourth planes, the first endcap receiving first ends of the first and second legs; and
  a second end cap sealing the fourth side of the filter media, the second end cap overlapping with the first leg and the second leg in at least one direction parallel to either the second, third, or fourth planes, the second end cap receiving second ends of the first and second legs.

14. The filter cartridge of claim 13, wherein the first end cap overlaps with the first leg and the second leg in a direction parallel to the first, third, and fourth planes.

15. The filter cartridge of claim 13, wherein the second end cap overlaps with the first leg and the second leg in a direction parallel to the second, third, and fourth planes.

16. The filter cartridge of claim 13 further comprising a seal extending under and around the top portion of the frame, the seal configured to be located against a filter housing to prevent contaminated fluid from passing into the filter housing, and wherein no portion of the seal member is positioned axially between the inlet flow face and the outlet flow face.

17. A filter cartridge comprising:
- a stack of sheets of fluted filter media configured in a generally rectangular block having an inlet flow face and an outlet flow face;
- a frame coupled to the block of fluted filter media, the frame including a top portion extending around and upwardly from the inlet flow face and a pair of legs extending down toward the outlet flow face of the filter media, the frame defining a generally rectangular opening through which fluid may pass to the inlet flow face of the filter media, the top portion of the frame extending outwardly away from the filter media; and
- a seal member extending around the filter media coupled to the portion of the top portion of the frame extending outwardly away from the filter media, wherein the frame includes a connection portion extending between the top portion and the legs, the connection portion defining a pair of channels, the filter cartridge further comprising first and second end walls each configured to couple to the filter media and to interface with one of the channels defined by the connection portion of the frame.

18. The filter cartridge of claim 17, wherein the outlet flow face and the inlet flow face are each generally planar.

19. The filter cartridge of claim 17, wherein the seal member is a foam pad prefilter.

20. The filter cartridge of claim 17, wherein the frame member has a top surface, and wherein the inlet flow face of the filter media is recessed below the top surface of the frame member.

21. A filter cartridge comprising:
- a stack of sheets of fluted filter media configured in a generally rectangular block having an inlet flow face and an outlet flow face;
- a prefilter located upstream of the inlet flow face; and
- a frame coupled to the block of fluted filter media, the frame including a top portion extending around and upwardly from the inlet flow face and the prefilter and a pair of legs extending past the prefilter and down toward the outlet flow face of the filter media, the frame defining a generally rectangular opening through which fluid may pass to the prefilter, the top portion of the frame extending outwardly away from the filter media;
- wherein the prefilter and the inlet flow face of the inlet flow face are recessed below a top surface of the frame;
- wherein the frame includes ribs extending across the generally rectangular opening; and wherein the prefilter is located between the ribs and the inlet flow face.

22. The filter assembly of claim 1, wherein the frame is coupled to the stack of filter media such that removal of the filter media from the housing removes the frame from the housing.

23. The filter assembly of claim 9, wherein the frame is permanently coupled to the stack of filter media such that the frame is removable and removal of the filter media from the housing removes the frame from the housing.

24. The filter cartridge of claim 13, wherein the filter cartridge is configured to mate with a filter housing; and
wherein the frame is permanently coupled to the stack of filter media such that removal of the filter cartridge from the housing removes the filter media and the frame from the housing.

25. The filter cartridge of claim 17, wherein the filter cartridge is configured to mate with a filter housing; and
wherein the frame is coupled to the stack of filter media such that removal of the filter cartridge from the housing removes the filter media and the frame from the housing.

26. The filter cartridge of claim 21, wherein the filter cartridge is configured to mate with a filter housing; and
wherein the frame is coupled to the stack of filter media such that removal of the filter cartridge from the housing removes the filter media and the frame from the housing.

27. The filter cartridge of claim 17, wherein no portion of the seal member is positioned axially between the inlet flow face and the outlet flow face.

* * * * *

UNITED STATES PATENT AND TRADEMARK OFFICE
CERTIFICATE OF CORRECTION

| | | |
|---|---|---|
| PATENT NO. | : 9,724,635 B2 | Page 1 of 1 |
| APPLICATION NO. | : 14/209378 | |
| DATED | : August 8, 2017 | |
| INVENTOR(S) | : Steven J. Merritt et al. | |

It is certified that error appears in the above-identified patent and that said Letters Patent is hereby corrected as shown below:

In the Claims

Column 19, Claim 7, Line 23 incorrectly reads "wherein the converting" and should correctly read --wherein the converging--

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*